US008849195B2

(12) United States Patent
Orihara et al.

(10) Patent No.: US 8,849,195 B2
(45) Date of Patent: Sep. 30, 2014

(54) ANTENNA DEVICE AND COMMUNICATION DEVICE

(75) Inventors: Katsuhisa Orihara, Tochigi (JP); Yoshito Ikeda, Tochigi (JP); Norio Saito, Tochigi (JP); Satoru Sugita, Tochigi (JP)

(73) Assignee: Dexerials Corporation, Tokyo (JP)

( * ) Notice: Subject to any disclaimer, the term of this patent is extended or adjusted under 35 U.S.C. 154(b) by 190 days.

(21) Appl. No.: 13/635,997

(22) PCT Filed: Mar. 31, 2011

(86) PCT No.: PCT/JP2011/058245
§ 371 (c)(1),
(2), (4) Date: Sep. 19, 2012

(87) PCT Pub. No.: WO2011/125850
PCT Pub. Date: Oct. 13, 2011

(65) Prior Publication Data

US 2013/0012127 A1 Jan. 10, 2013

(30) Foreign Application Priority Data

Mar. 31, 2010 (JP) ................................ 2010-082037
Mar. 28, 2011 (JP) ................................ 2011-070666

(51) Int. Cl.
*H04B 5/00* (2006.01)
*H01Q 1/22* (2006.01)
*H01Q 7/00* (2006.01)
*H01Q 1/24* (2006.01)

(52) U.S. Cl.
CPC ............ *H01Q 1/243* (2013.01); *H01Q 1/2225* (2013.01); *H01Q 7/00* (2013.01)
USPC .......................................... 455/41.1; 343/787

(58) Field of Classification Search
USPC ......... 455/39, 41.1; 336/84 M, 179; 343/787, 343/788, 700 R
See application file for complete search history.

(56) References Cited

U.S. PATENT DOCUMENTS 8,357,257 B2 * 1/2013 Aramaki et al. ............. 156/245
8,466,791 B2 * 6/2013 Goto et al. ................ 340/572.7
(Continued)

FOREIGN PATENT DOCUMENTS

JP 2004-166176 A 6/2004
JP 2005-333244 A 12/2005
(Continued)

OTHER PUBLICATIONS

International Search Report w/translation from PCT/JP2011/058245 mailed Jul. 5, 2011 (2 pages).

*Primary Examiner* — Sonny Trinh
(74) *Attorney, Agent, or Firm* — Osha Liang LLP

(57) ABSTRACT

The present invention provides a communication device that can reduce a housing of an electronic device in size and thickness when the communication device is built in the electronic device. The communication device includes: an antenna coil (11*a*) arranged on an outer peripheral portion (134) of a housing (131) surface facing a reader/writer (120) of a mobile phone (130); a magnetic sheet (13) that attracts a magnetic field transmitted from the reader/writer (120) to the antenna coil (11*a*); and a communication processing unit (12) that is driven by a current flowing in the antenna coil (11*a*) and performs communication with the reader/writer (120), wherein the magnetic sheet (13) is arranged on the reader/writer (120) side of the antenna coil (11*a*) at a center portion (132*a*), and the antenna coil (11*a*) is arranged on the reader/writer (120) side on an outer periphery (130*d*) side.

8 Claims, 30 Drawing Sheets

(56) References Cited

U.S. PATENT DOCUMENTS

| | | | | |
|---|---|---|---|---|
| 8,697,225 | B2 * | 4/2014 | Aramaki et al. | 428/141 |
| 2012/0200167 | A1 * | 8/2012 | Orihara et al. | 307/104 |
| 2012/0204414 | A1 * | 8/2012 | Orihara et al. | 29/593 |
| 2012/0227248 | A1 * | 9/2012 | Orihara et al. | 29/593 |
| 2013/0181805 | A1 * | 7/2013 | Saito et al. | 336/84 M |

FOREIGN PATENT DOCUMENTS

| | | | |
|---|---|---|---|
| JP | 2007-013662 | A | 1/2007 |
| JP | 2008-35464 | A | 2/2008 |

* cited by examiner

FIG. 34A
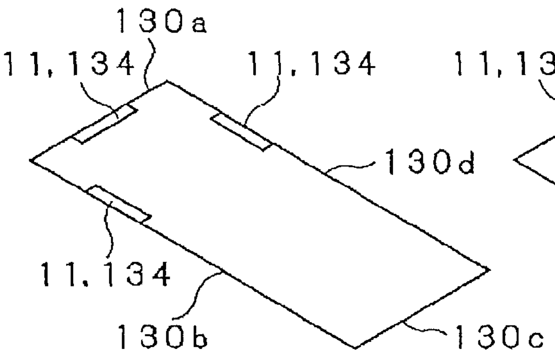
FIG. 34B
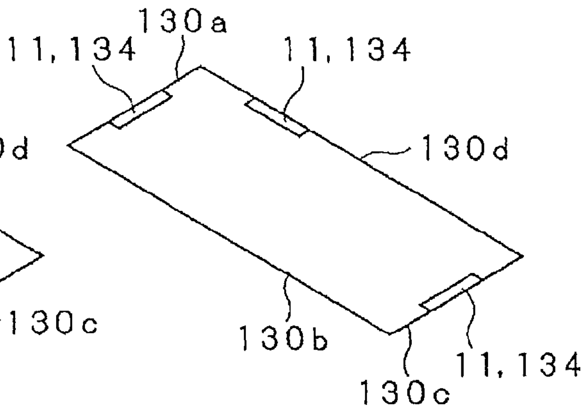
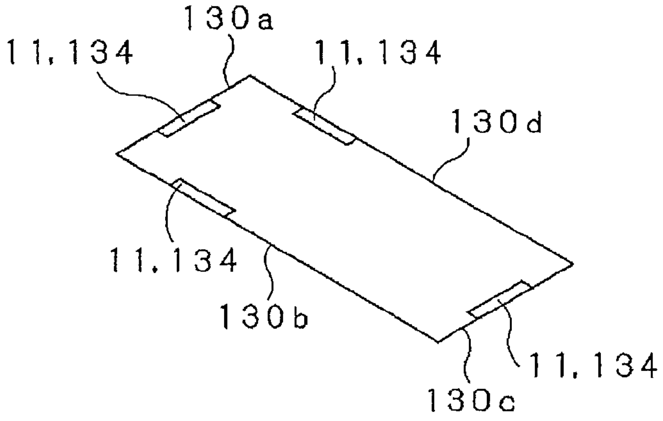
FIG. 35

ANTENNA DEVICE AND COMMUNICATION DEVICE

FIELD OF THE INVENTION

This present invention relates to an antenna device and a communication device that are built in an electronic device and can perform communication by receiving a magnetic field transmitted from a transmitter.

CROSS-REFERENCE TO RELATED APPLICATIONS

The present application asserts priority rights based on JP Patent Application 2010-082037 filed in Japan on Mar. 31, 2010 and JP Patent Application 2011-070666 filed in Japan on Mar. 28, 2011. The total contents of disclosure of the Patent Application of the senior filing date are to be incorporated by reference in to the present Application.

BACKGROUND OF THE INVENTION

An electronic device such as a mobile phone uses an antenna module for RFID (Radio Frequency Identification) to mount a near field contactless communication function thereon.

The antenna module performs communication with an antenna coil mounted on a transmitter such as a reader/writer by using inductive coupling. More specifically, in the antenna module, the antenna coil receives a magnetic field from the reader/writer to make it possible to drive an IC that converts the magnetic field into an electric power to function as a communication processing unit.

The antenna module must receive a magnetic flux having a certain value or more from the reader/writer to reliably perform communication. For this purpose, in the antenna module according to the conventional technique, a loop coil is arranged in the housing of the mobile phone to receive a magnetic flux from the reader/writer with the coil.

However, in an antenna module built in an electronic device such as a mobile phone, since magnetic fluxes from the reader/writer are reflected by an eddy current generated when a metal contained in a circuit board in the device or a buttery pack receives a magnetic field from the reader/writer, a smaller number of magnetic fluxes reach the loop coil. In this manner, since the number of magnetic fluxes reaching the loop coil becomes small, the antenna module requires a loop coil having a certain size to collect required magnetic fluxes. Furthermore, the number of magnetic fluxes must be increased by using a magnetic sheet.

As described above, magnetic fluxes from a reader/writer are reflected by an eddy current flowing in a circuit board of an electronic device such as a mobile phone, some magnetic field components face an surface direction of the circuit board are present on a housing source of the electronic device. A coil that receive the components to function as an antenna is proposed in Patent Document 1. More specifically, in Patent Document 1, in order to reduce an occupied area of a coil, an antenna structure obtained by winding a coil on a ferrite core is proposed.

CITATION LIST

Patent Literature

Patent Document 1: Japanese Unexamined Patent Publication No. 2008-35464

SUMMARY OF THE INVENTION

As described above, since an electronic device such as a mobile phone uses a circuit board or the like that is relatively conductive, an eddy current is generated in the circuit board that receives a magnetic field to reflect the magnetic field. For example, in consideration of the housing surface of a mobile phone, a magnetic field transmitted from a reader/writer tends to be strong at a peripheral portion of the housing surface and to be weak near the center of the housing surface.

In an antenna using a normal loop coil, the loop coil has an opening located at a center portion of a mobile phone that cannot receive a large amount of magnetic field passing through the outer peripheral portion of the housing surface described above. For this reason, in an antenna using a normal loop coil, efficiency of receiving a magnetic field is deteriorated.

In an antenna structure in which a coil is winded on a ferrite core described in Patent Document 1 and the coil is built in a mobile phone, a section of the ferrite core has an area that collects magnetic fluxes. For this reason, the ferrite core requires a thickness of, for example, 1 mm or more, and the housing of the mobile phone has a relatively thick structure. Thus, in a relatively thin mobile phone, the structure is difficult to be mounted. When the antenna module is built on a rear side of a liquid-crystal display mounted on a foldable mobile phone, the antenna module is also required to be thin. For this reason, a space for the antenna structure described in Patent Document 1 cannot be easily secured.

The present invention has been proposed in consideration of the above circumstances, and has as its object to provide an antenna device and a communication device that can reduce a housing of an electronic device in size and thickness when the antenna device and the communication device are built in the electronic device while keeping communication characteristics.

In order to solve the above problem, the present invention provides an antenna device that is built in an electronic device and that can perform communication by receiving a magnetic field transmitted from a transmitter, including: an antenna coil arranged on an outer peripheral portion of a housing surface facing the transmitter of the electronic device and inductively coupled to the transmitter; and a magnetic sheet that attracts a magnetic field transmitted from the transmitter to the antenna coil, wherein the antenna coil and the magnetic sheet are superposed on each other to satisfy at least one of arrangement conditions including an arrangement condition in which the magnetic sheet is located on the transmitter side of the antenna coil on a center side of the housing surface and an arrangement condition in which the antenna coil is located on the transmitter side of the magnetic sheet on an outer periphery side of the housing surface.

The present invention provides a communication device that is built in an electronic device and can perform communication by receiving a magnetic field transmitted from a transmitter, including: an antenna coil arranged on an outer peripheral portion of a housing surface facing the transmitter of the electronic device and inductively coupled to the transmitter; a magnetic sheet that attracts a magnetic field transmitted from the transmitter to the antenna coil; and a communication processing unit that is driven by a current flowing in the antenna coil and performs communication with the transmitter, wherein the antenna coil and the magnetic sheet are superposed on each other to satisfy at least one of arrangement conditions including an arrangement condition in which the magnetic sheet is located on the transmitter side of the antenna coil on a center side of the housing surface and an arrangement condition in which the antenna coil is located on the transmitter side of the magnetic sheet on an outer periphery side of the housing surface.

According to the present invention, the antenna coil and the magnetic sheet are superposed on each other to satisfy at least one of the arrangement conditions including the arrangement condition in which the magnetic sheet is located on the transmitter side of the antenna coil on the center side of the housing surface and the arrangement condition in which the antenna coil is located on the transmitter side of the magnetic sheet on the outer periphery side of the housing surface. When the magnetic sheet is arranged as described above, according to the present invention, magnetic fluxes generated on the outer peripheral portion of the housing surface of the electronic device facing the transmitter can be efficiently attracted to the antenna coil to make it possible to reduce the housing of the electronic device in size and thickness when the antenna device or the communication device is built in the electronic device by arranging the antenna coil is arranged on the outer peripheral portion while maintaining communication characteristics.

BRIEF DESCRIPTION OF THE DRAWINGS

FIG. 34A is a diagram showing three antenna substrates arranged on the outer peripheral portions of the outer periphery 130*a* side, the outer periphery 130*b* side, and the outer periphery 130*d* side, and FIG. 34B is a diagram showing two antenna substrates arranged on the outer peripheral portions of the outer periphery 130*a* side, the outer periphery 130*c* side, and the outer periphery 130*d* side.

FIG. 35 is a diagram showing four antenna substrates arranged on the outer peripheral portions of the outer periphery 130*a* side, the outer periphery 130*b* side, the outer periphery 130*c* side, and the outer periphery 130*d* side.

DETAILED DESCRIPTION OF THE INVENTION

Embodiments to execute the present invention will be described in detail with reference to the accompanying drawings. The present invention is not limited to only the embodiments, and various changes of the present invention can be effected without departing from the spirit and scope of the invention, as a matter of course.

Figure 1:
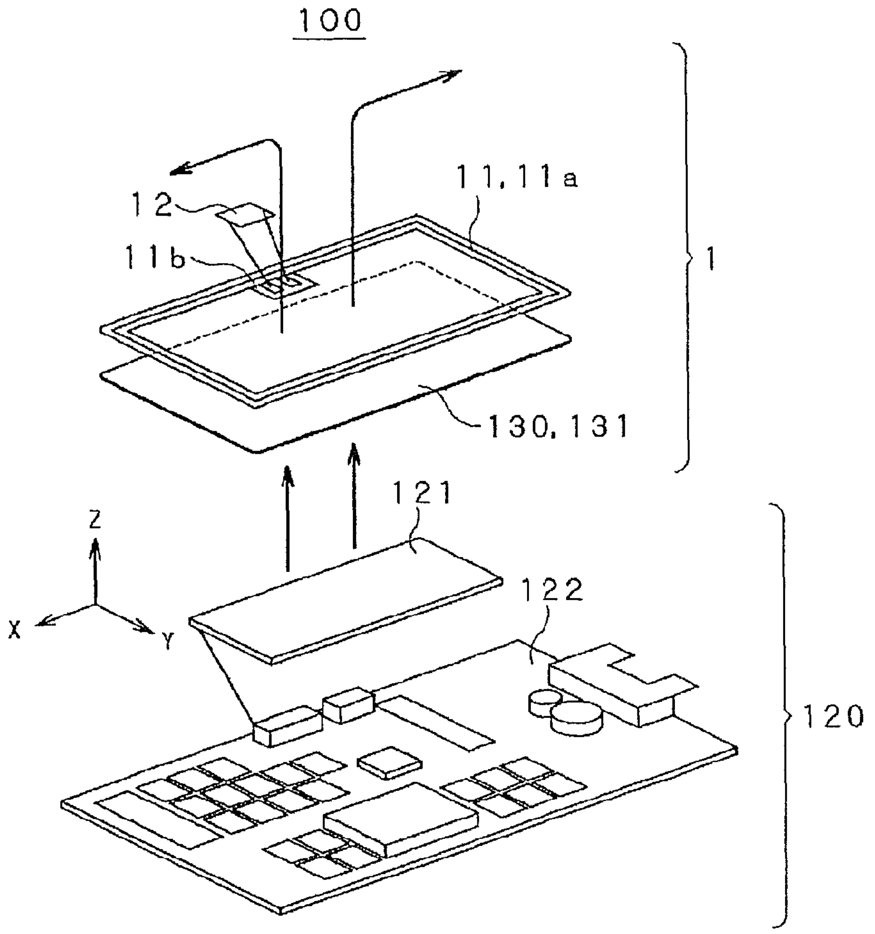
FIG. 1 is a diagram for explaining a configuration of a wireless communication system in which a communication device to which the present invention is applied is built.

A communication device to which the present invention is applied is a device that is built in an electronic device and that can perform communication by receiving a magnetic field transmitted from a transmitter. The communication device is used by being built in a wireless communication system 100 for RFID (Radio Frequency Identification) as shown in, for example, FIG. 1.

The wireless communication system 100 includes a communication device 1 according to a first example to which the present invention is applied and a reader/writer 120 that accesses the communication device 1. In this case, it is assumed that the communication device 1 and the reader/writer 120 are arranged to face each other on an x-y plane of a three-dimensional orthogonal coordinate system xyz.

The reader/writer 120 functions as a transmitter that transmits a magnetic field in a z-axis direction to the communication device 1 facing the reader/writer 120 on the x-y plane. More specifically, the reader/writer 120 includes an antenna 121 that transmits a magnetic field to the communication device 1 and a control board 122 that communicates with the communication device 1 inductively coupled through the antenna 121.

More specifically, in the reader/writer 120, the control board 122 electrically connected to the antenna 121 is arranged. A control circuit including electronic parts such as one or a plurality of integrated circuit chips is mounted on the control board 122. The control circuit executes processes of various types on the basis of data received from the communication device 1. For example, when the control circuit transmits data to the communication device 1, the control circuit encodes the data, modulates a carrier wave having a predetermined frequency (for example, 13.56 MHz) on the basis of the encoded data, amplifies the modulated modulating signal, and causes the modulating signal to drive the antenna 121. When the control circuit reads data from the communication device 1, the control circuit amplifies a modulating signal of the data received by the antenna 121, demodulates the amplified modulating signal of the data, and decodes the demodulated data. In the control circuit, an encoding method and a modulating method used in a general reader/writer are used. For example, the Manchester encoding method or the ASK (Amplitude Shift Keying) modulating method is used.

The communication device 1 is built in a housing 131 of a mobile phone 130 arranged to face the reader/writer 120 on the x-y plane, and includes an antenna substrate 11 on which an antenna coil 11*a* that can communicate with the inductively coupled reader/writer 120 is mounted, and a communication processing unit 12 that is driven by a current flowing in the antenna coil 11*a* to communicate with the reader/writer 120.

On the antenna substrate 11, the antenna coil 11*a* formed by performing a patterning process or the like to a flexible conductor such as a flexible flat cable and a terminal unit 11*b* electrically connected to the antenna coil 11*a* and the communication processing unit 12.

When the antenna coil 11*a* receives a magnetic field generated from the reader/writer 120, the antenna coil 11*a* magnetically coupled to the reader/writer 120 by inductive coupling, receives a modulated carrier wave, and supplies the received signal to the communication processing unit 12 through the terminal unit 11*b*.

The communication processing unit 12 is driven by a current flowing in the antenna coil 11*a* and communicates with the reader/writer 120. More specifically, the communication processing unit 12 demodulates the received modulating signal, decodes the demodulated data, and writes the decoded data in an internal memory included in the communication processing unit 12. The communication processing unit 12 reads data transmitted to the reader/writer 120 from the internal memory, encodes the read data, modulates a carrier wave on the basis of the encoded data, and transmits the modulated radio wave to the reader/writer 120 through the antenna substrate 11 magnetically coupled by inductive coupling.

First Embodiment

In the wireless communication system 100 having the above configuration, the configuration of the communication device 1 according to the first example will be described below as the first embodiment.

Figure 2:
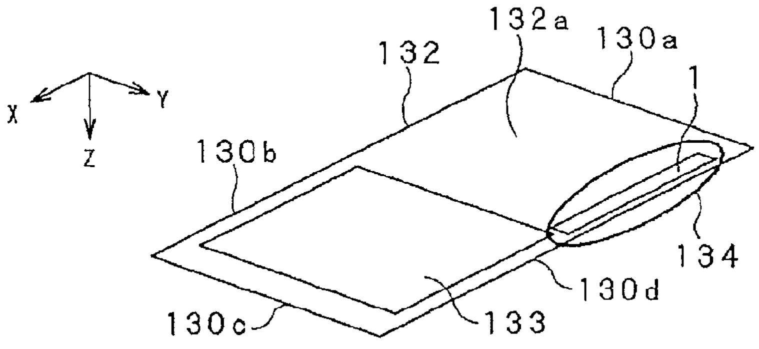
FIG. 2 is a diagram for explaining a configuration of a communication device arranged in a housing of a mobile phone.

The communication device 1 according to the first example, in terms of realization of reductions in size and thickness of an electronic device such as the mobile phone 130 when the communication device 1 is built in the electronic device while maintaining communication characteristics between the reader/writer 120 and the communication device 1, for example, is arranged on a circuit board 132 in the housing 131 of the mobile phone 130 on a Z-y plane of the three-dimensional orthogonal coordinate system xyz. In FIG. 2, it is assumed that a magnetic sheet 133 to cover a battery pack to drive the mobile phone 130 is arranged in a partial region of the circuit board 132 in the housing 131 of the mobile phone 130

The antenna coil 11*a* of the communication device 1 is preferably arranged at a position where a magnetic field from the reader/writer 120 is strong to maintain the communication characteristics between the antenna coil 11*a* and the reader/writer 120. In this case, since the circuit board 132 of the mobile phone 130 easily conducts electricity, an eddy current is generated when an external AC magnetic field is applied to the circuit board 132 to reflect a magnetic field. When a magnetic field distribution obtained by applying an external AC is examined, magnetic fields of the four peripheries 130*a*, 130*b*, 130*c*, and 130*d* that are outer peripheries on the surface of the housing 131 of the mobile phone 130 arranged to face the reader/writer 120 are strong.

In this case, by using the characteristics of magnetic field strength in the housing 131 of the mobile phone 130, the communication device 1, as shown in FIG. 2, is arranged on an outer peripheral portion 134 on the outer periphery 130*d* side of the outer peripheries 130*a*, 130*b*, 130*c*, and 130*d* having strong magnetic fields. In this manner, the communication device 1 can be arranged at a position where a magnetic field strength on the circuit board 132 of the mobile phone 130 is relatively high.

A magnetic field of the outer peripheral portion 134 on which the communication device 1 is arranged has a large magnetic field component in a planar direction of the circuit board 132, more specifically, a large y-direction component from a center portion 132*a* of the circuit board 132 to the outer periphery 130*d*. The communication device 1 includes a magnetic sheet 13 that is arranged as shown in FIGS. 3A and 3B to cause the antenna coil 11*a* to efficiently attract the component from the center portion 132*a* of the circuit board 132 to the outer periphery 130*d* and is superposed on the antenna coil 11*a*.

Figure 3A:
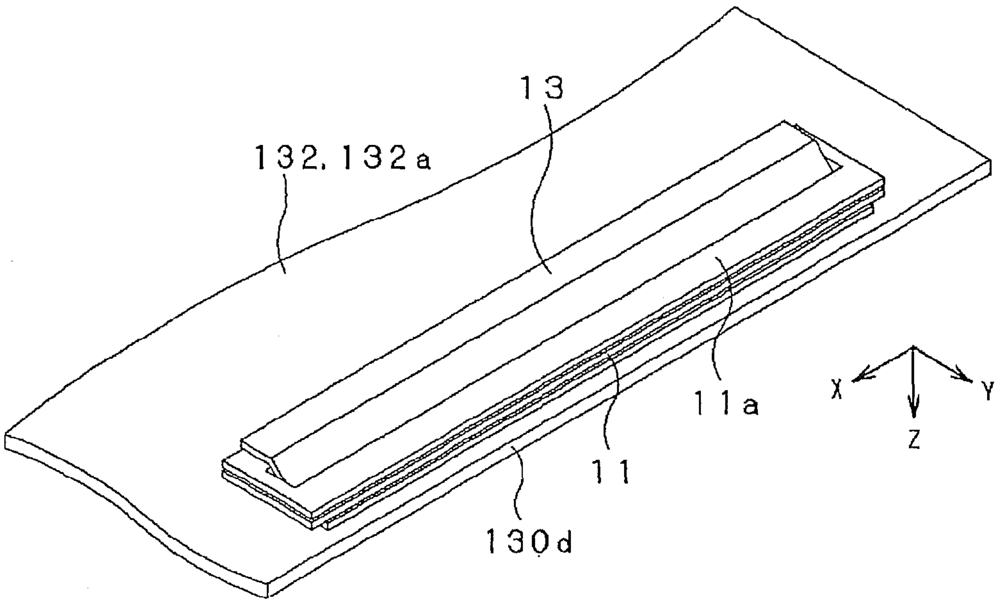
FIG. 3A is a perspective view of an antenna substrate according to a first example.
Figure 3B:
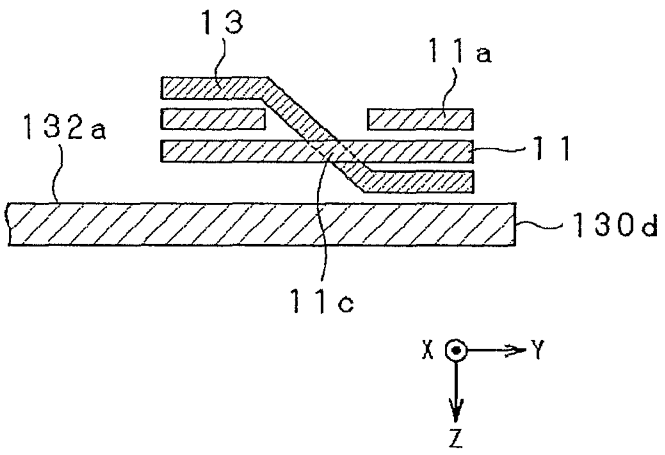
FIG. 3B is a sectional view of an antenna substrate according to the first example.

In this case, FIG. 3A is a perspective view of the antenna substrate 11 in which the magnetic sheet 13 is inserted on an x-y plane, and FIG. 3B is a sectional view of the antenna substrate 11 in which the magnetic sheet 13 is interposed on the x-y plane. In the communication device 1 shown in FIGS. 3A and 3B, the number of turns of the antenna coil 11*a* is set to 1.

As shown in FIG. 3B, in the communication device 1, the magnetic sheet 13 is inserted into a center portion 11*c* of the antenna coil 11*a* formed on the antenna substrate 11 such that, on the center portion 132*a* side of the circuit board 132, the magnetic sheet 13 is arranged to be located on the reader/writer 120 side of the antenna coil 11*a*, and on the outer periphery 130*d* side of the circuit board 132, the antenna coil 11*a* is arranged.

In this case, as the antenna substrate 11, as described above, a flexible printed circuit board, a rigid printed circuit board, or the like is used. However, in particular, by using the flexible printed circuit board, a notched portion can be easily formed in the center portion of the antenna coil 11*a*, and the magnetic sheet 13 can be easily inserted into the notched portion. In this manner, in terms of easily insertion of the magnetic sheet 13 into the antenna substrate 11, in the communication device 1, the antenna substrate 11 is preferably formed by using the flexible printed circuit board. More specifically, by using the flexible printed circuit board, the communication device 1 can be easily manufactured.

In this manner, in the communication device 1, on the center portion 132*a* side of the circuit board 132, the magnetic sheet 13 is arranged to be located on the reader/writer 120 side of the antenna coil 11*a*, and on the outer periphery 130*d* side of the circuit board 132, the antenna coil 11*a* is arranged to be located on the reader/writer 120 side of the magnetic sheet 13. In this manner, as is apparent from the performance evaluation performed in comparison with the following first and second comparative example, a magnetic field generated on the outer peripheral portion 134 can be efficiently attracted by the antenna coil 11*a*.

Figure 4A:
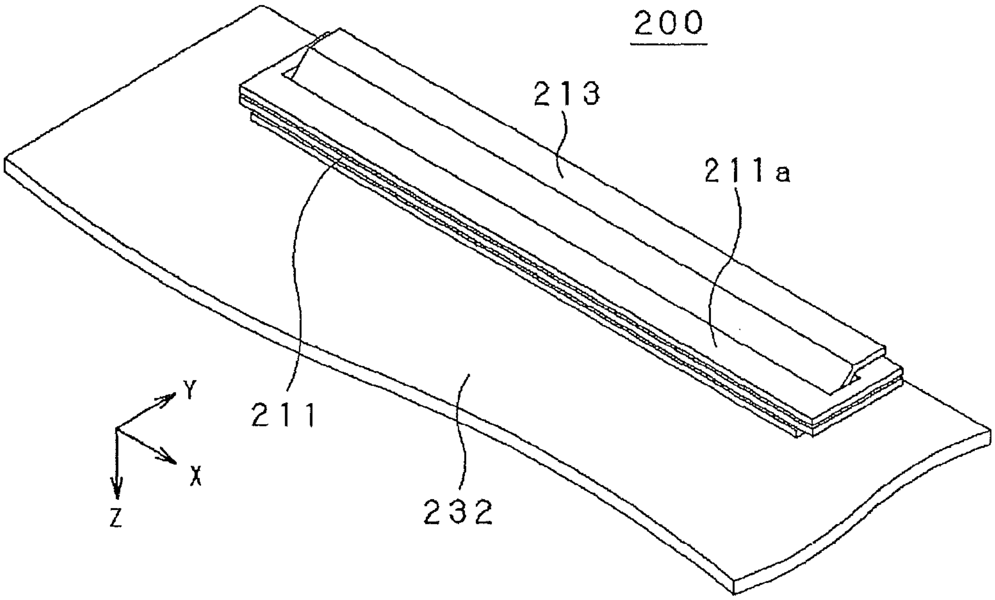
FIG. 4A is a perspective view of an antenna substrate according to a first comparative example.
Figure 4B:
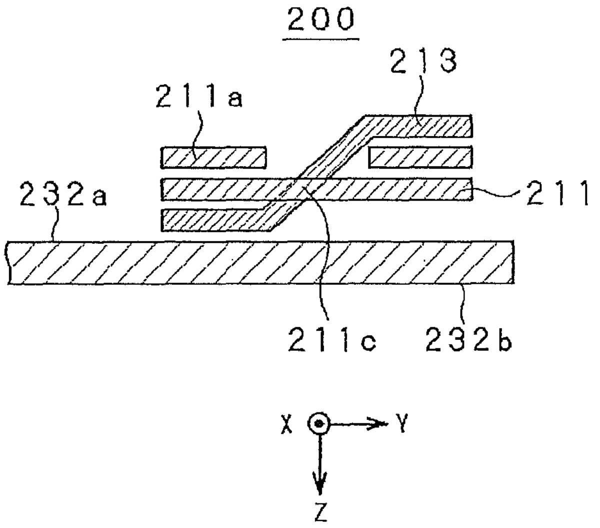
FIG. 4B is a sectional view of the antenna substrate according to the first comparative example.

As the first comparative example, the configuration of a communication device 200 arranged on a circuit board 232 of a mobile phone will be described below with reference to FIGS. 4A and 4B. FIG. 4A is a perspective view of an antenna substrate 211 on which a magnetic sheet 213 is arranged on an x-y plane, and FIG. 4B is a sectional view of the antenna substrate 211 on which the magnetic sheet 213 is arranged on the x-y plane. In the communication device 200 shown in FIGS. 4A and 4B, like the communication device 1 according to the first example shown in FIGS. 3A and 3B, it is assumed that the number of turns of an antenna coil 211*a* is set to 1 and that antenna characteristics determined by design conditions such as an antenna size are equal to those in the communication device 1.

As shown in FIG. 4B, in the communication device 200 according to a comparative example, as in the communication device 1 according to the embodiment, although a magnetic sheet is inserted into the center portion of an antenna substrate, the magnetic sheet is inserted from a different direction. More specifically, the magnetic sheet 213 according to the communication device 200 is arranged such that, on a center portion 232*a* of the circuit board 232, the antenna coil 211*a* is arranged to be located on a reader/writer side and, on an outer periphery side 232*b* of the circuit board 232, the magnetic sheet 213 is arranged to be located on the reader/writer side of the antenna coil 211*a*.

Figure 5:
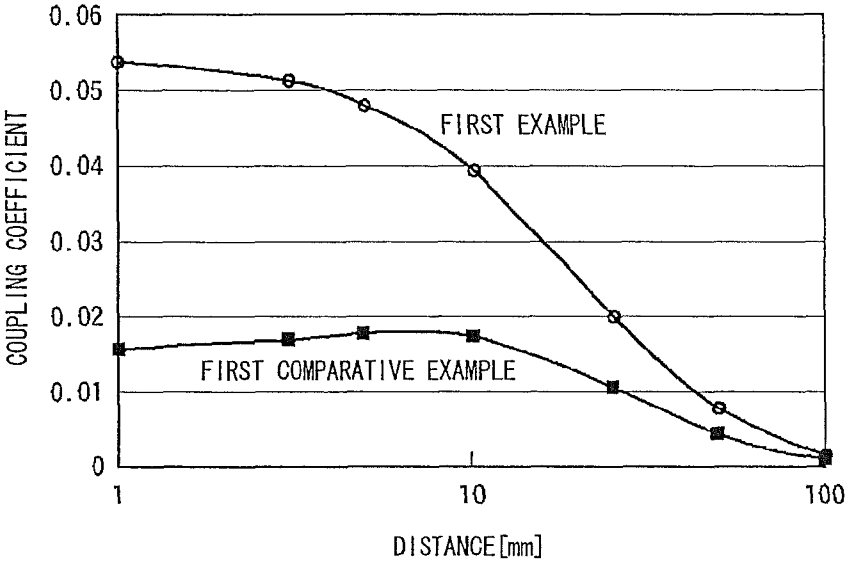
FIG. 5 is a graph showing a measurement result related to communication characteristics between the communication device according to the first example and the communication device according to the first comparative example.

A measurement result related to communication characteristics between the communication device 1 according to the first example and the communication device 200 according to the first comparative example is shown in FIG. 5.

FIG. 5 shows coupling coefficients between a reader/writer and the communication devices 1 and 200 when a distance between a reader/writer and a mobile phone is changed. In this case, the coupling coefficients are values representing (mutual inductance/√(inductance of antenna coil x inductance of reader/writer coil)), and is used as an index to evaluate communication characteristics.

Figure 6A:
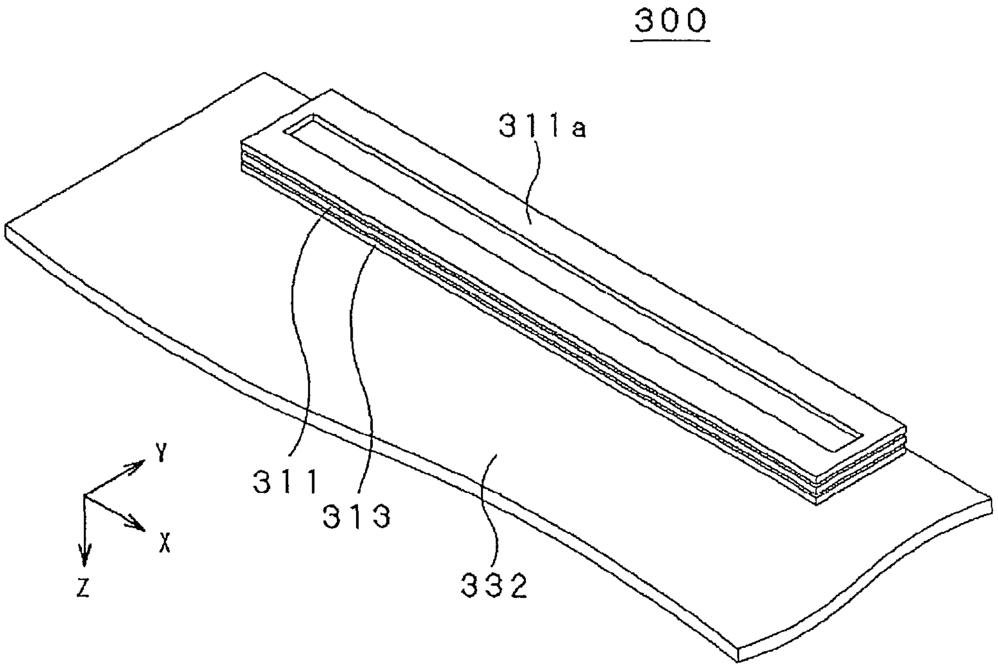
FIG. 6A is a perspective view of an antenna substrate according to a second comparative example.
Figure 6B:
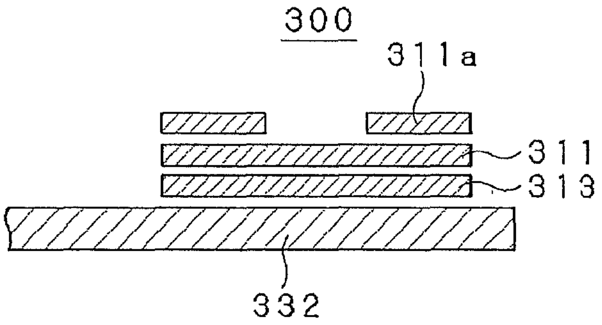
FIG. 6B is a sectional view of the antenna substrate according to the second comparative example.

As a second comparative example, a configuration of a communication device 300 arranged on a circuit board 332 of a mobile phone will be described below with reference to FIGS. 6A and 6B. FIG. 6A is a perspective view of an antenna substrate 311 on which a magnetic sheet 313 is arranged on an x-y plane, and FIG. 6B is a sectional view of the antenna substrate 311 on which the magnetic sheet 313 is arranged on the x-y plane. In the communication device 300 shown in FIGS. 6A and 6B, as in the communication device 1 according to the example shown in FIGS. 3A and 3B, it is assumed that the number of turns of an antenna coil 311*a* is set to 1 and that antenna characteristics determined by design conditions such as an antenna size are equal to those in the communication device 1. As shown in FIG. 6B, in the communication device 300 according to the second comparative example, regardless of distinction between an outer periphery side and an inner periphery side, the magnetic sheet 313 is arranged at a position where the magnetic sheet 313 is superposed on the antenna coil 311*a* such that the antenna coil 311*a* is closer to the reader/writer than the magnetic sheet 313.

Figure 7:
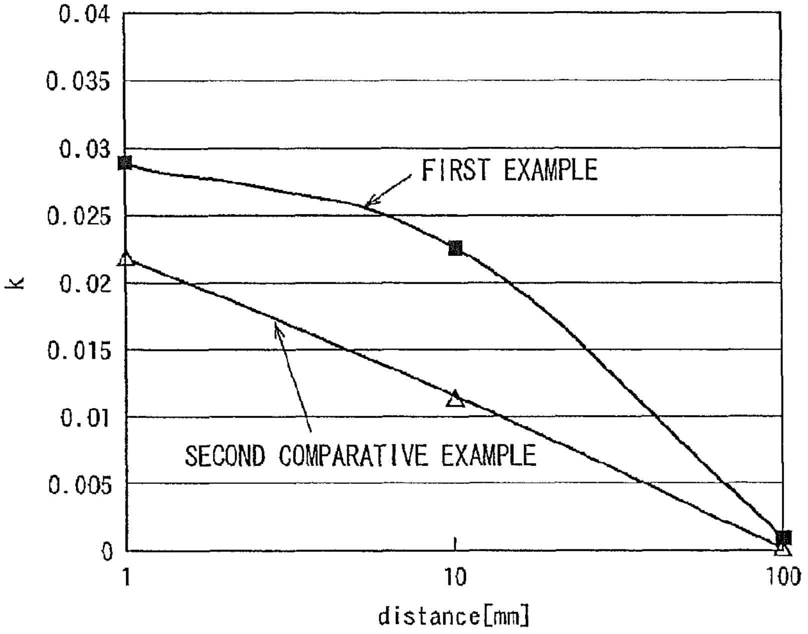
FIG. 7 is a graph showing a measurement result related to communication characteristics between the communication device according to the first example and the communication device according to the second comparative example.
Figure 8:
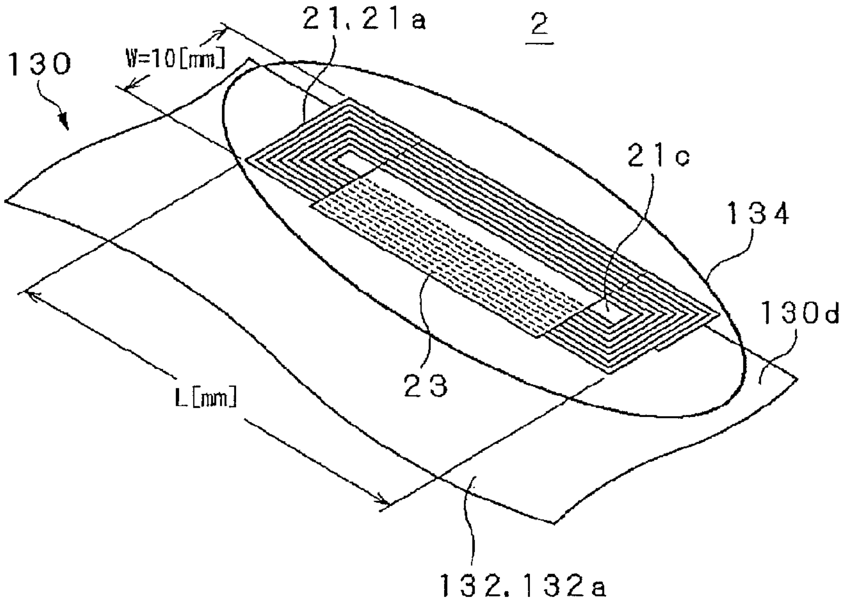
FIG. 8 is a perspective view of an antenna substrate in which the number of turns of an antenna coil is set to 8, a width W orthogonal to an outer periphery is set to 10 [mm], a length along the outer periphery is set to L [mm], and a magnetic sheet is inserted into a center portion of the antenna coil in the communication device according to a second example.

A measurement result related to communication characteristics between the communication device 1 according to the first example and the communication device 300 according to the second comparative example is shown in FIG. 7.

FIG. 7 shows coupling coefficients between a reader/writer and the communication devices 1 and 300 when a distance between a reader/writer and a mobile phone is changed.

As is apparent from the measurement results in FIGS. 5 and 7, the communication device 1 according to the first example has a coupling coefficient larger than those of the communication devices 200 and 300 according to the comparative examples. In FIGS. 5 and 7, a change in coupling coefficient of the communication device 1 is different because design conditions such as an antenna size are different from each other.

As described above, as is apparent from the measurement results in FIGS. 5 and 7, the communication device 1 according to the example has a coupling coefficient larger than those of the communication devices 200 and 300 according to the comparative examples.

As is apparent from the performance evaluation, in the communication device 1, on the center portion 132*a* side of the circuit board 132, the magnetic sheet 13 is arranged to be located on the reader/writer 120 side of the antenna coil 11*a*, and on the outer periphery 130*d* side of the circuit board 132, the antenna coil 11*a* is arranged to be located on the reader/writer 120 side. In this manner, a magnetic field generated on the outer peripheral portion 134 can be efficiently attracted by the antenna coil 11*a*.

The magnetic field generated on the outer peripheral portion 134 can be attracted by the antenna coil 11*a* as described above because the magnetic sheet 13 is arranged as described above to cause a magnetic field component from the center portion 132*a* of the circuit board 132 to the outer periphery 130*d* to efficiently pass through an opening of the antenna coil 11*a*.

In the communication device to which the present invention is applied, since the magnetic field generated on the outer peripheral portion can be efficiently attracted by the antenna coil, for example, as is apparent from performance evaluation obtained in comparison with the following third comparative example, good communication characteristics can be obtained without increasing an antenna coil in area. As a result, a mobile phone in which the communication device is built can be reduced in size and thickness.

As the first embodiment, a communication device 2 according to a second example, a magnetic sheet 23 is inserted into a center portion 21*c* of an antenna coil 21*a* formed on an antenna 21 such that, on the center portion 132*a* side of the circuit board 132, the magnetic sheet 23 is arranged to be located on the reader/writer side of the antenna coil 21*a* and, on the outer periphery 130*d* side of the circuit board 132, the antenna coil 21*a* is arranged to be located on the reader/writer side of the magnetic sheet 23.

The communication device 2 is regulated such that the number of turns of the antenna coil 21*a* is set to 8, a width W orthogonal to an outer periphery 230*d* is set to 10 [mm], and a length along the outer periphery 230*d* is set to L [mm].

Figure 9:
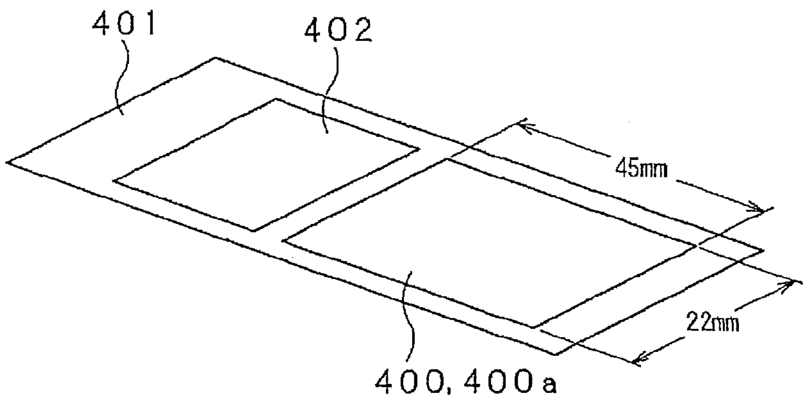
FIG. 9 is a diagram for explaining a configuration of a communication device according to a third comparative example.

In a communication device 400 according to a third comparative example, as shown in FIG. 9, an antenna coil 400*a* is arranged in a region except for a magnetic sheet 402 to cover a battery pack on a circuit board of a mobile phone. The number of turns of the antenna coil 400*a* is set to 4, and an opening thereof has a shape having 22 [mm] high by 45 [mm] width.

Figure 10:
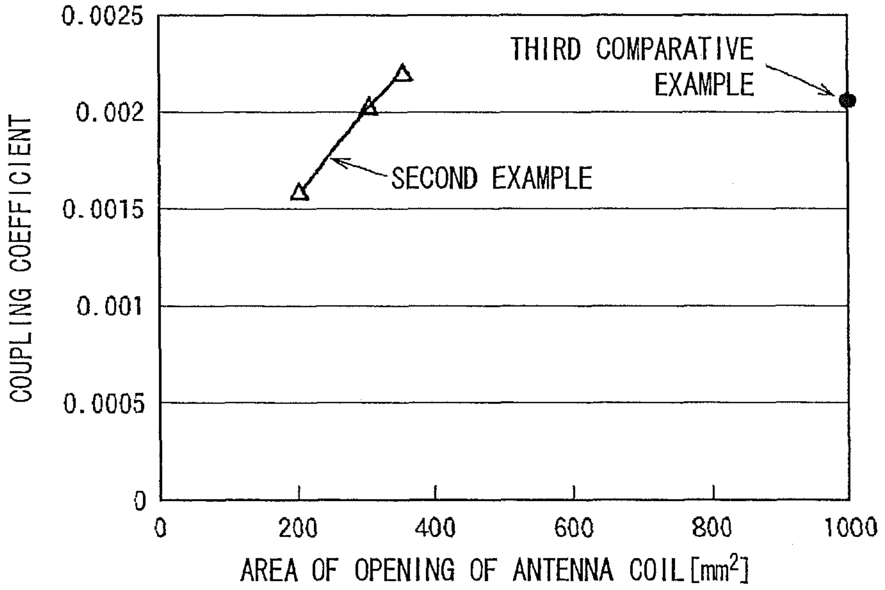
FIG. 10 is a graph for explaining changes of communication characteristics when an area of the antenna coil is changed by changing a value of a length L of one side of the antenna coil.

A measurement result related to communication characteristics between the communication device 2 according to the second example and the communication device 400 according to the third comparative example is shown in FIG. 10.

FIG. 10 shows coupling coefficients between the reader/writer and the communication devices 2 and 400 when the area of the opening of the antenna coil 11*a* regulated with W×L is changed.

As is apparent from FIG. 10, the communication device 2 can obtain communication characteristics equivalent to those of the communication device 400 when the area of the antenna is about 300 [$mm^2$] or more. More specifically, the communication device 2 can obtain the same communication characteristics as described above even though the area of the opening of the antenna coil is smaller than that in the communication device 400. In this manner, the communication device 2 is arranged on the outer peripheral portion 134 to make it possible to realize the communication characteristics equivalent to those of the communication device 400 according to the third comparative example even though the antenna coil 21*a* having an opening having a relatively small area. Thus, the communication device 2 can further reduce an occupied area of the mobile phone 130 on the circuit board 132 while maintaining the communication characteristics. As a result, the mobile phone 130 can be reduced in size and thickness.

In this manner, in the communication devices 1 and 2, the magnetic sheet and the antenna coil are superposed on each other to satisfy an arrangement condition in which the magnetic sheet is located on the reader/writer side of the antenna coil on the center side of the housing surface and a condition in which the antenna coil is located on the reader/writer side of the magnetic sheet on the outer periphery side of the housing surface. When the magnetic sheet is arranged as described above, the communication devices 1 and 2 efficiently attract magnetic fluxes generated on the outer peripheral portion of the housing surface of the electronic device such as a mobile phone facing the reader/writer to the antenna coil to make it possible to reduce a space in the electronic device while maintaining the communication characteristics. For this reason, the electronic device can be reduced in size and thickness.

In the communication device to which the present invention is applied, even though, of the antenna coil arranged on the outer peripheral portion of the housing surface facing the reader/writer, more specifically, as shown in FIGS. 11A and 11B and FIGS. 12A and 12B, the magnetic sheet is superposed on one of the center side of the housing surface and the outer periphery side, the electronic device can be reduced in size and thickness while maintaining the communication characteristics.

Figure 11A:
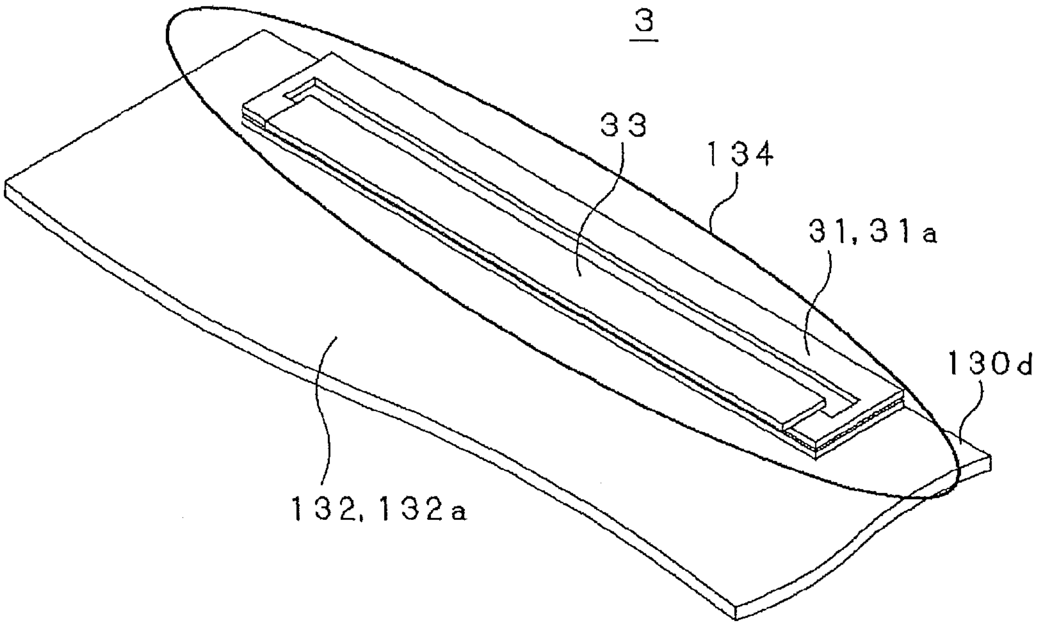
FIG. 11A is a perspective view of an antenna substrate according to a third example.
Figure 11B:
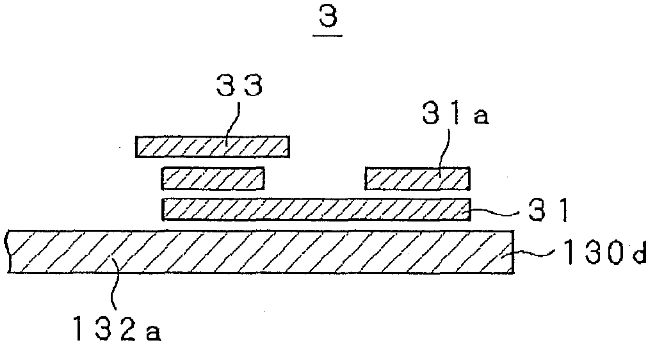
FIG. 11B is a sectional view of the antenna substrate according to the third example.

As the first embodiment, a communication device 3 according to a third example, as shown in FIG. 11A, as in the communication devices 1 and 2 according to the first and second examples, is arranged on the outer peripheral portion 134 on the outer periphery 130*d* side on the circuit board 132. FIG. 11B is a sectional view of an antenna substrate 31 on which a magnetic sheet 33 is arranged. In the communication device 1 shown in FIG. 11B, the number of turns of an antenna coil 31*a* is set to 1.

As shown in FIG. 11B, the magnetic sheet 33 is arranged to be located on the reader/writer side of the antenna coil 31*a* on the center portion 132*a* side of the circuit board 132.

Figure 12A:
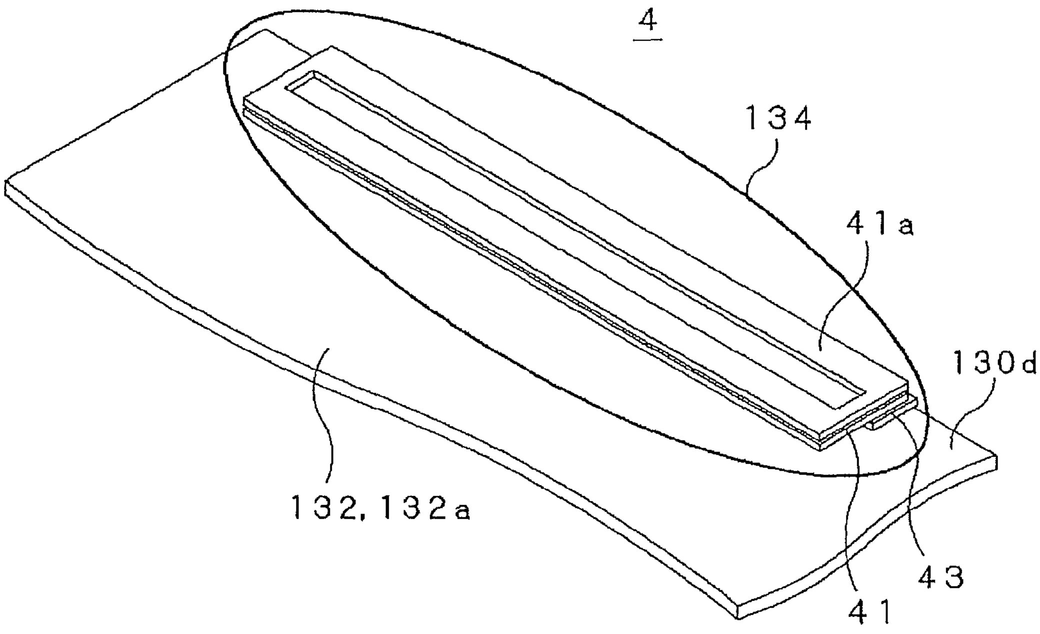
FIG. 12A is a perspective view of an antenna substrate according to a fourth example.
Figure 12B:
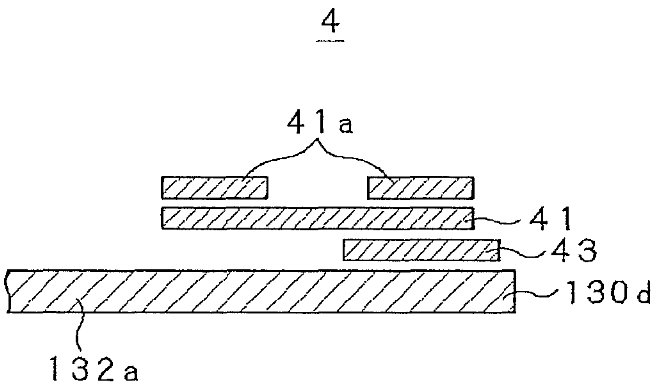
FIG. 12B is a sectional view according to the antenna substrate according to the fourth example.

As the first embodiment, a communication device 4 according to a fourth example, as shown in FIG. 12A, as in the communication devices 1 and 2 according to the first and second examples, is arranged on the outer peripheral portion 134 on the outer periphery 130*d* on the circuit board 132. FIG. 12B is a sectional view of an antenna substrate 41 on which a magnetic sheet 43 is arranged. In the communication device 4 shown in FIG. 12B, the number of turns of an antenna coil 41*a* is set to 1.

As shown in FIG. 12B, the magnetic sheet 43 is arranged such that the antenna coil 41*a* is located on the reader/writer side on the outer periphery 130*d* of the circuit board 132.

Figure 13:
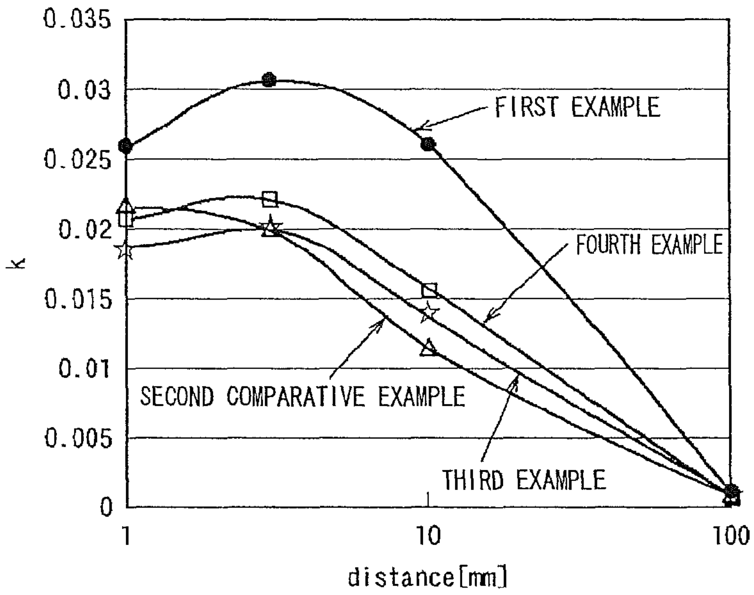
FIG. 13 is a graph for explaining communication characteristics of a reader/writer and communication devices when distances between the reader/writer and a mobile telephone is changed.

Measurement results of the communication characteristics of the communication devices 3 and 4 according to the third and fourth examples are shown in FIG. 13 with reference to the communication characteristics of the communication device 1 according to the first example and the communication device 300 according to the second comparative example. FIG. 13 shows coupling coefficients between a reader/writer and communication devices when a distance between the reader/writer and a mobile phone is changed.

As is apparent from the measurement result in FIG. 13, the communication devices 3 and 4 according to the third and fourth examples have communication characteristics poorer than those of the communication device 1 according to the first example. However, the communication devices 3 and 4 have coupling coefficients larger than that of the communication device 300 according to a comparative example.

As is apparent from the result, the communication device to which the present invention is applied satisfies at least one of an arrangement condition in which, on the center portion 132*a* side of the circuit board 132, the magnetic sheet 33 is located on the reader/writer side of the antenna coil 31*a* and an arrangement condition in which, on the outer periphery 130*d* side of the circuit board 132, the antenna coil 41*a* is located on the reader/writer side of the magnetic sheet 43 so as to cause the antenna coil to efficiently attract a magnetic field generated on the outer peripheral portion 134.

Thus, in the communication device to which the present invention is applied, of the antenna coil arranged on the outer peripheral portion of the housing surface facing the reader/writer, at least one of the center side and the outer periphery side of the housing surface and the magnetic sheet are arranged to be superposed. In this manner, the housing of the electronic device can be reduced in thickness while maintaining the communication characteristics.

Second Embodiment

Figure 14A:
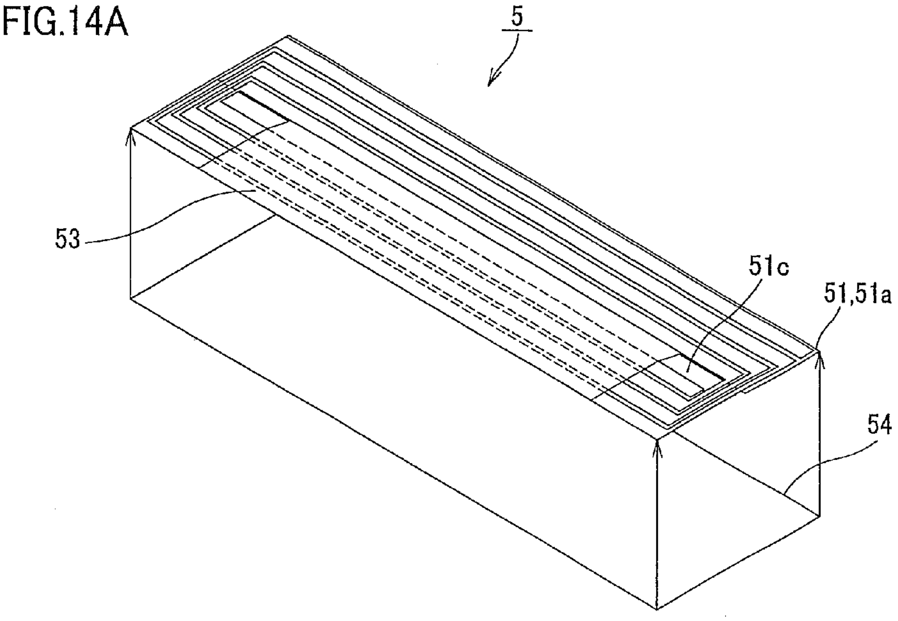
FIG. 14A is a diagram showing a configuration of a configuration of a conductive plate superposed on an antenna substrate according to a fifth example.

A communication device to which the present invention is applied, as a second embodiment, for example, as shown in FIG. 14A, a conductive plate having a conductivity higher than that of a metal body constituting a housing is arranged on the housing side of the electronic device to make it possible to realize more preferable communication characteristics.

Figure 14B:
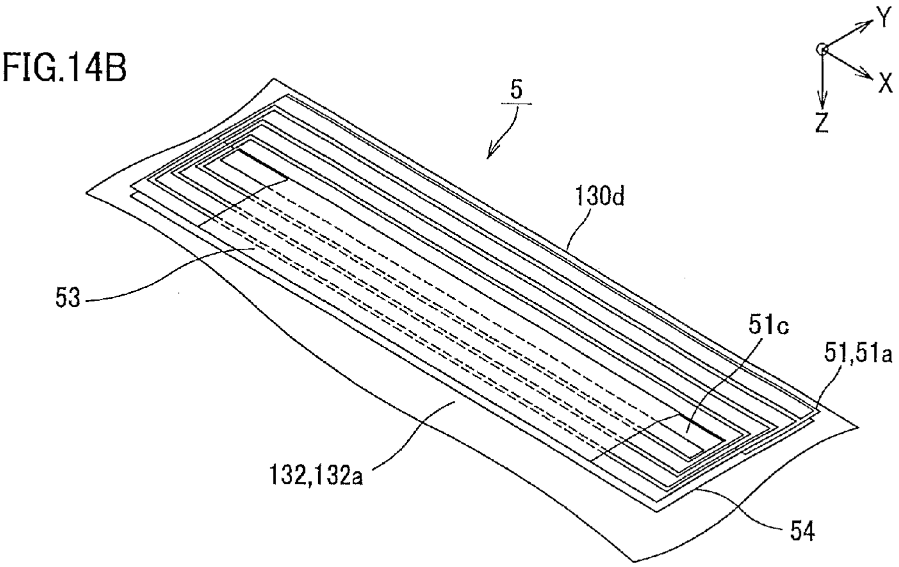
FIG. 14B is a perspective view showing the antenna substrate according to the fifth example.

That is, a communication device 5 according to a fifth example shown in FIG. 14A, as in the first example, a magnetic sheet 53 is inserted into a center portion 51*c* of an antenna coil 51*a* formed on the antenna substrate 51. Furthermore, the communication device 5 according to the fifth example, as shown in FIG. 14B, includes a plate-shaped conductive plate 54 superposed on the circuit board 132 serving as a metal plate arranged inside the housing 131 to entirely cover the outer peripheral portion of the antenna coil 11*a*. More specifically, in the communication device 5, the conductive plate 54 is arranged to be in contact with the circuit board 132 side. The conductive plate 54 is superposed to be electrically insulated from the antenna coil 51*a*.

The communication device 5 according to the fifth embodiment configured as described above, as shown in FIG. 14B, on the center portion 132*a* side of the circuit board 132, the magnetic sheet 53 is arranged to be located on the reader/writer 120 side of the antenna coil 51*a*, and the magnetic sheet 53 is inserted into the center portion 51*c* of the antenna coil 51*a* formed on the antenna substrate 51 such that, on the outer periphery 130*d* side of the circuit board 132, the antenna coil 51*a* is arranged to be located on the reader/writer 120 side of the magnetic sheet 53.

In this case, as the conductive plate 54, a conductive material having a conductivity higher than that of the circuit board 132 is used. For example, in order to protect the mobile phone 130 from external force or the like, when the circuit board 132 is made of stainless steel, as the conductive plate 54, a metal member having an electric conductivity higher than that of stainless steel, for example, copper (Cu) is used as a conductive material.

In this case, when the mobile phone 130 is regarded as a whole metal body, the mobile phone 130 is considered to have an electric conductivity lower than that of copper (Cu). However, as described above, for example, since a stainless-steel plate is attached to a rear surface of a liquid display portion formed on the mobile phone 130 to protect a liquid crystal, in the example, it is assumed that the circuit board 132 almost has an electric conductivity ($1\times10^6$ s/m) that is equal to the electric conductivity of stainless steel. For this reason, in the communication device 5, the conductive plate 54 made of an electric conductivity higher than that of a metal plate arranged around the antenna coil 51*a* is arranged between the antenna coil 51*a* and the circuit board 132, as is apparent from the following performance evaluation, to make it possible to suppress the communication characteristics from being deteriorated in comparison with a configuration that does not have the conductive plate 54.

In this case, in consideration of the conductivity characteristics of the actual mobile phone 130 as a whole, an electric conductivity of the circuit board 132 may be lower than or higher than $1\times10^6$ s/m that is an electric conductivity of a metal material corresponding to stainless steel. Thus, as the performance evaluation, communication characteristics of the communication device 5 obtained when the electric conductivity of the circuit board 132 is changed are evaluated.

Figure 15A:
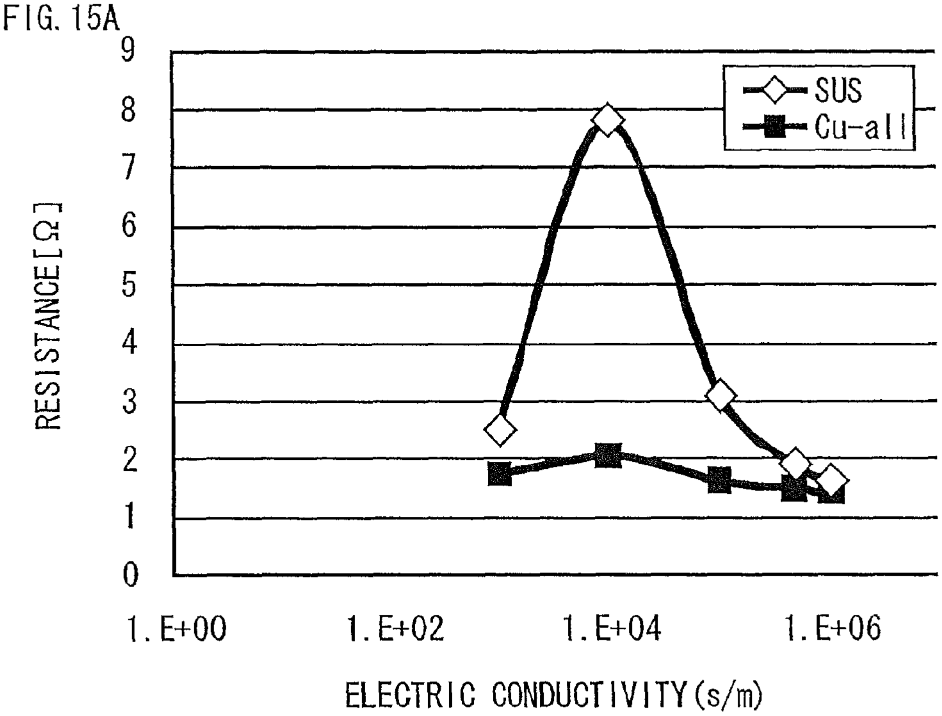
FIG. 15A is a graph for explaining characteristics of a resistance of the antenna coil according to the fifth example.

FIG. 15A is a graph in which "Cu-all" indicates a resistance of the antenna coil 51*a* of the communication device 5 and "SUS" indicates a resistance of an antenna coil when the antenna substrate 51 is arranged on the circuit board 132 without using the conductive plate 54.

Figure 15B:
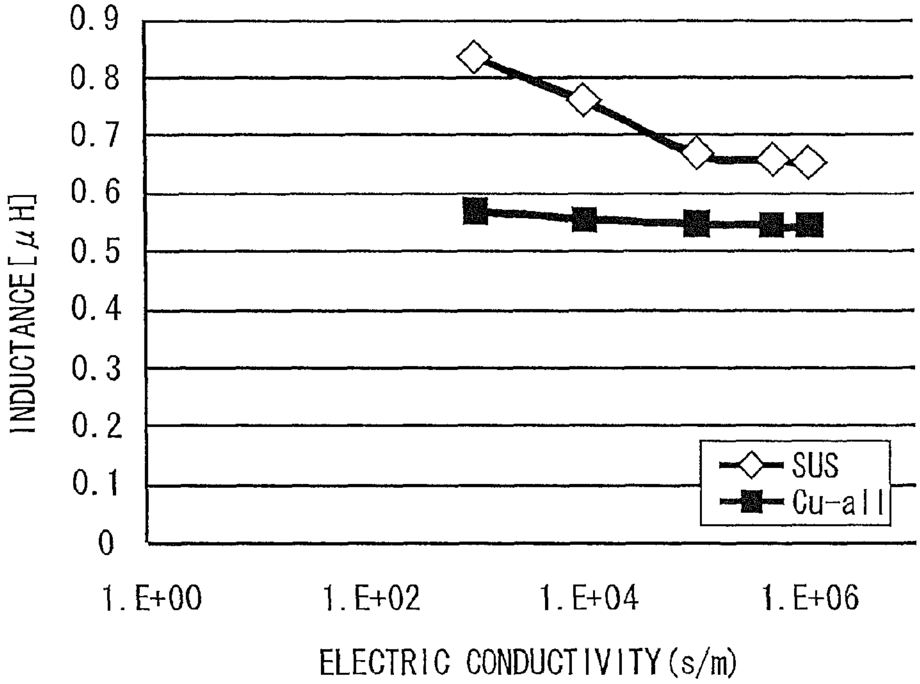
FIG. 15B is a graph for explaining characteristics of an inductance of the antenna coil according to the fifth example.

FIG. 15B is a graph in which "Cu-all" indicates an inductance of the antenna coil 51*a* of the communication device 5 and "SUS" indicates an inductance of an antenna coil when the antenna substrate 51 is arranged on the circuit board 132 without using the conductive plate 54.

As is apparent from FIGS. 15A and 15B, the antenna coil related to "SUS" has a maximal resistance when the electric conductivity is $1\times10^4$ s/m and has an inductance that increases with a decrease in electric conductivity of the stainless steel. In contrast to this, in the antenna coil 51*a* related to the communication device 5 indicated by "Cu-all", the resistance and the inductance rarely changed for a variation in electric conductivity.

Figure 16:
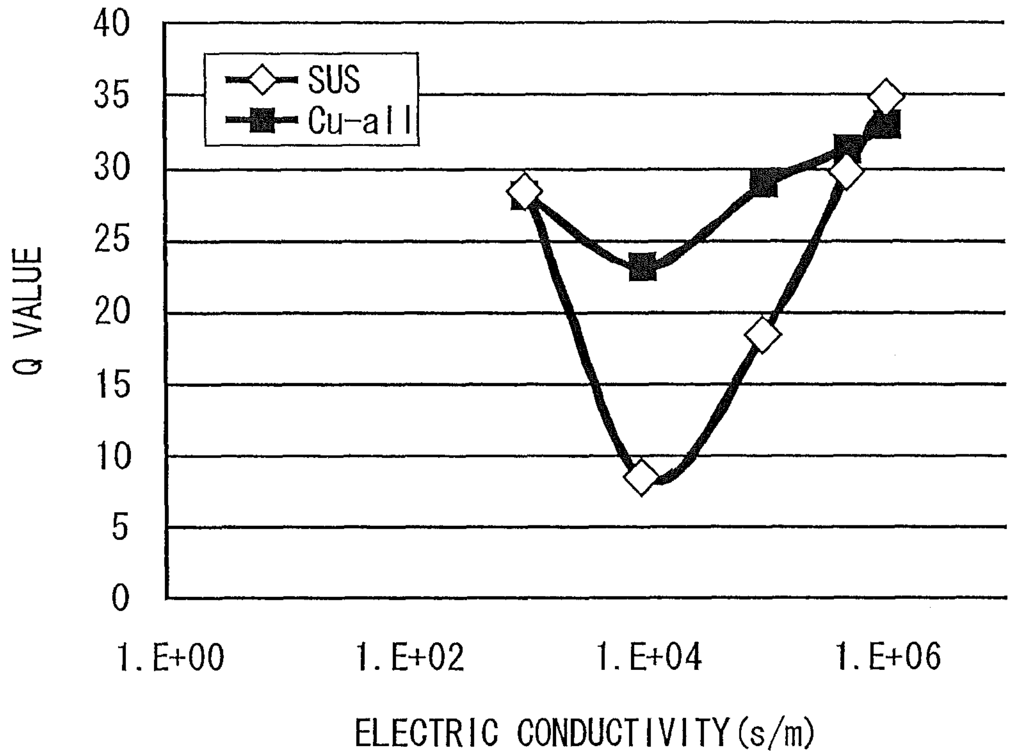
FIG. 16 is a graph for explaining characteristics of a Q value of the antenna coil according to the fifth example.

FIG. 16 is a graph in which "Cu-all" indicates a Q value of the antenna coil 51*a* of the communication device 5 and "SUS" indicates a Q value of an antenna coil when the antenna substrate 51 is arranged on the circuit board 132 without using the conductive plate 54.

As is apparent from FIG. 16, in the communication device 5, when the conductive plate 54 is arranged between the circuit board 132 and the antenna substrate 51, in comparison with the case in which the conductive plate 54 is not arranged, the Q value is large and slightly changes. As is apparent from the result, the communication device 5 can be stably operated while maintaining preferable communication characteristics.

In this manner, a stable operation can be performed while maintaining preferable communication characteristics because, although eddy currents are generated in the circuit board 132 and the conductive plate 54 depending on a current flowing in the antenna coil, the antenna coil 11*a* is entirely covered against the circuit board 132 by the conductive plate 54 made of copper (Cu) having an electric conductivity higher than that of a stainless-steel plate to make it possible to suppress thermal energy consumed by the eddy current generated by the circuit board 132.

Furthermore, the communication device 5 is required to be designed such that, as is apparent from the performance evaluation using communication devices according to the following fourth and fifth comparative examples, the conductive plate 54 is superposed to cover at least an entire area of the antenna coil 51*a*.

Figure 17A:
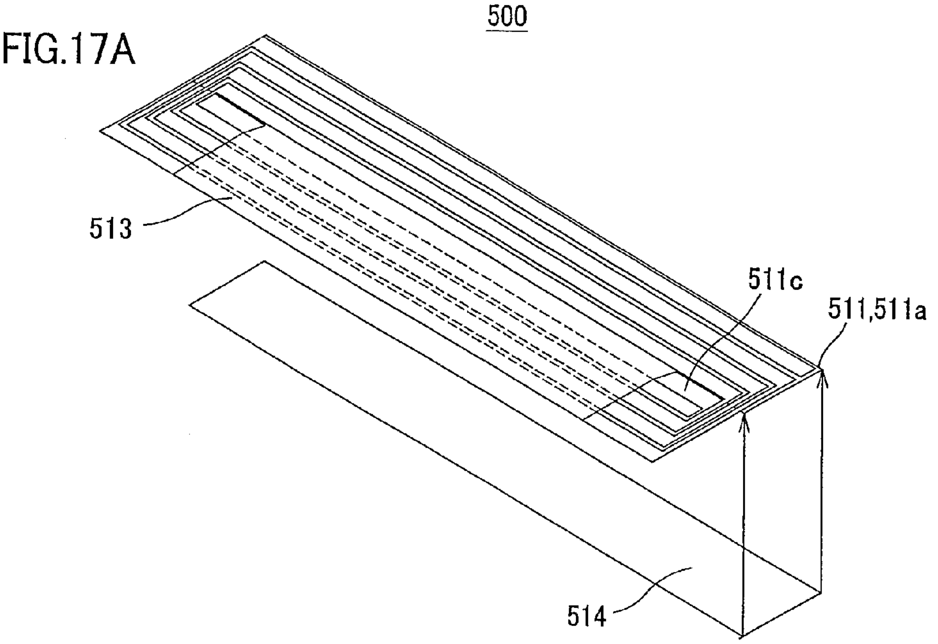
FIG. 17A is a diagram showing a configuration of a conductive plate superposed on an antenna substrate according to a fourth comparative example.
Figure 17A:
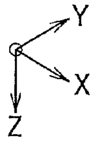
Figure 17B:
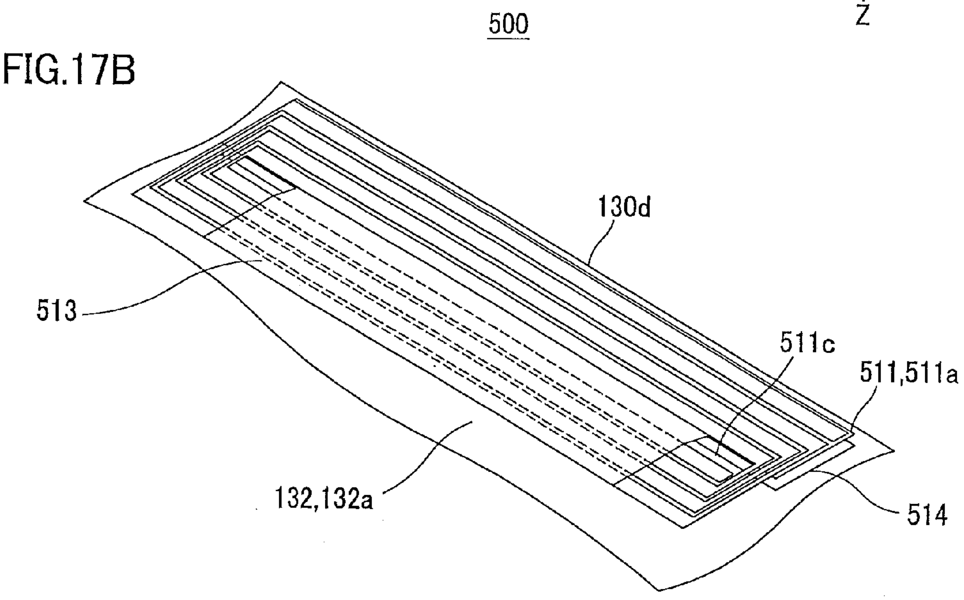
FIG. 17B is a perspective view showing the antenna substrate according to the fourth comparative example.

FIGS. 17A and 17B are diagrams showing a communication device 500 according to a fourth comparative example. In the communication device 500, as shown in FIG. 17A, as in the fifth example, a magnetic sheet 513 is inserted into a center portion 511*c* of an antenna coil 511*a* formed on an antenna substrate 511. The communication device 500 is different from the communication device 5 according to the fifth example in that, on the antenna substrate 511, a conductive plate 514 is superposed on only a region in which the antenna coil 511*a* is located on the reader/writer 120 side of the magnetic sheet 513. More specifically, in the communication device 500 according to the fourth comparative example, the area of the conductive plate 514 is half the area of the conductive plate 54 of the communication device 5 according to the fifth example.

Figure 18A:
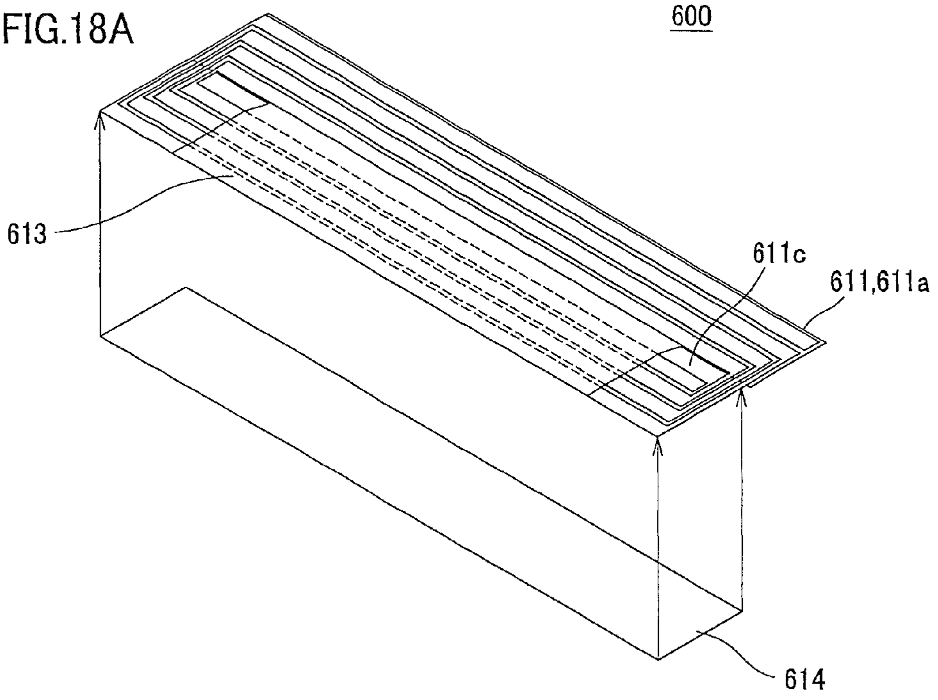
FIG. 18A is a diagram showing a configuration of a conductive plate superposed on an antenna substrate according a fifth comparative example.
Figure 18A:
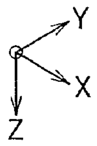
Figure 18B:
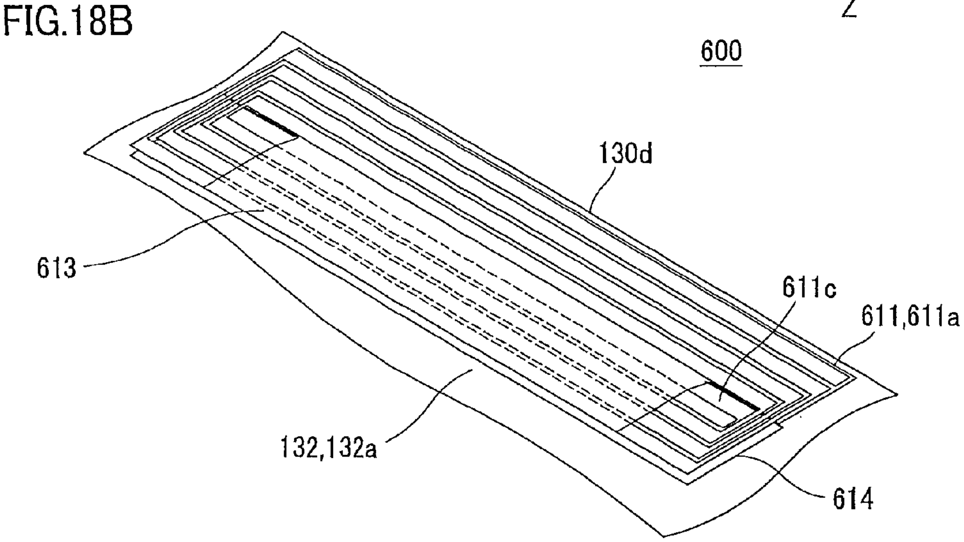
FIG. 18B is a perspective view showing the antenna substrate according to the fifth comparative example.

FIGS. 18A and 18B are diagrams showing a communication device 600 according to a fifth comparative example. In the communication device 600, as shown in FIG. 18A, as in the fifth example, a magnetic sheet 613 is inserted into a center portion 611*c* of an antenna coil 611*a* formed on an antenna substrate 611. The communication device 600 is different from the communication device 5 according to the fifth example in that, on the antenna substrate 611, a conductive plate 614 is superposed on only a region in which the magnetic sheet 613 is located on the reader/writer 120 side of the antenna coil 611*a*. More specifically, in the communication device 600 according to the fifth comparative example, the area of the conductive plate 614 is half the area of the conductive plate 54 of the communication device 5 according to the fifth example.

Communication characteristics obtained when the electric conductivity of the circuit board 132 is changed are evaluated.

Figure 19A:
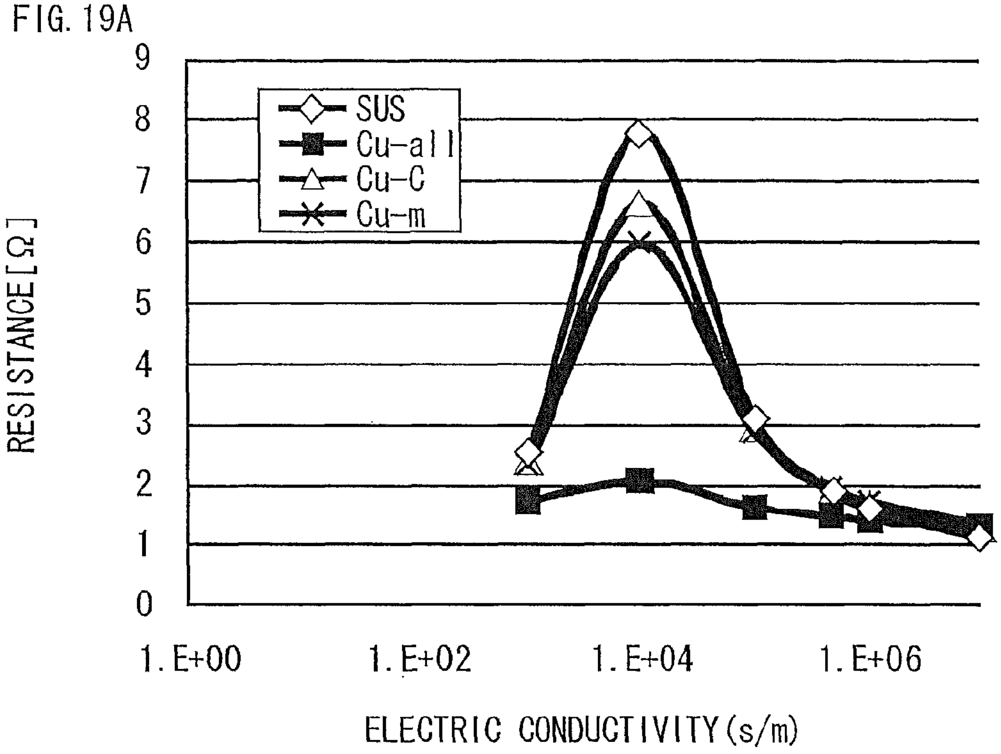
FIG. 19A is a graph for explaining characteristics of a resistance of an antenna coil according to the fifth example.

FIG. 19A, as in FIG. 15A, shows resistances related to "Cu-all" and "SUS", and is a graph in which "Cu-C" indicates a resistance of the antenna coil 511*a* according the fourth comparative example and "Cu-m" indicates a resistance of the antenna coil 611*a* according to the fifth comparative example.

Figure 19B:
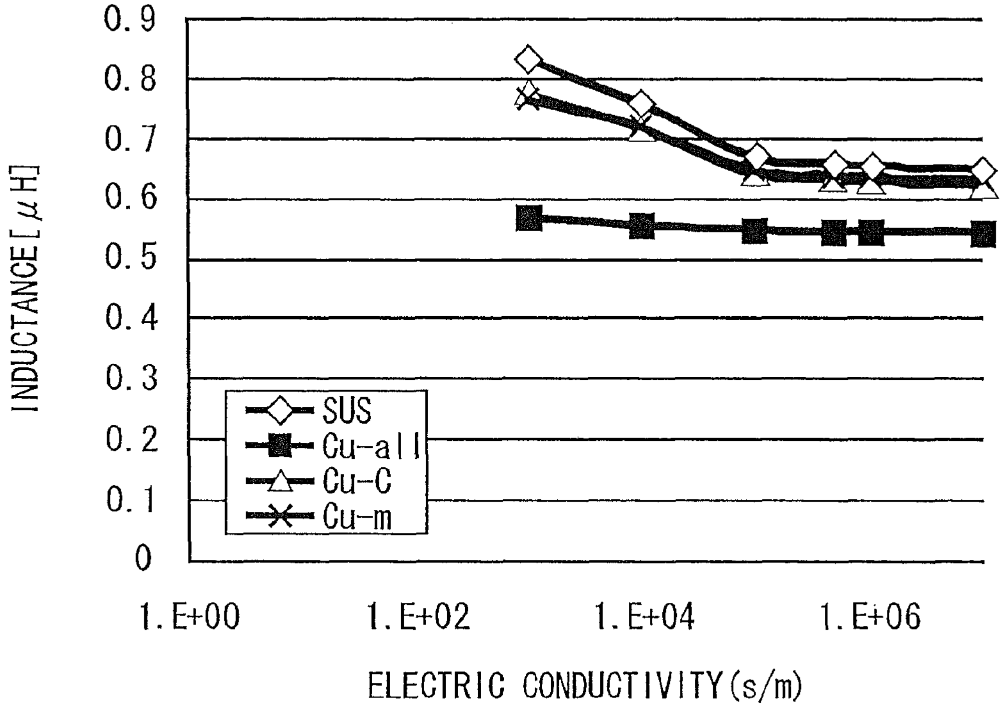
FIG. 19B is a graph for explaining characteristics of an inductance of the antenna coil according to the fifth example.

FIG. 19B, as in FIG. 15B, shows inductances of antenna coils related to "Cu-all" and "SUS", and is a graph in which "Cu-C" indicates an inductance of the antenna coil 511*a* according to the fourth comparative example and "Cu-m" indicates an inductance of the antenna coil 611*a* according to the fifth comparative example.

As is apparent from FIGS. 19A and 19B, a conductive plate, in the fourth and fifth comparative examples in each of which the conductive plate is not superposed on the circuit board 132 to entirely cover the outer peripheral portion of the antenna coil, unlike in the fifth example, the resistance of the antenna coil cannot be suppressed. In the fourth and fifth comparative examples, unlike in the fifth example, the resistance and the inductance of the antenna coil largely change depending on a change in electric conductivity of stainless steel.

Figure 20:
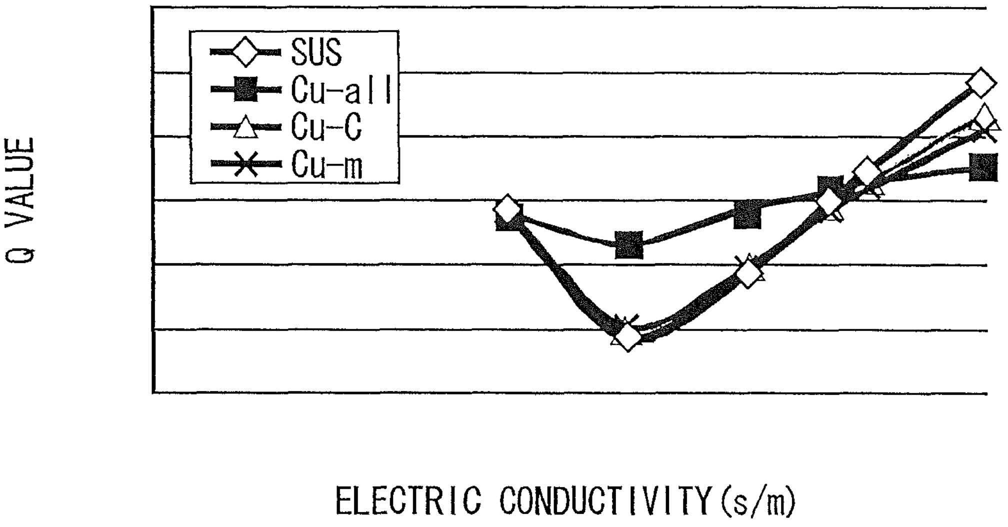
FIG. 20 is a graph for explaining characteristics of a Q value of the antenna coil according to the fifth example.

FIG. 20, as in FIG. 16, shows Q values of the antenna coils related to "Cu-all" and "SUS" and is a graph in which "Cu-C" indicates a Q value of the antenna coil 511*a* according to the fourth comparative example and "Cu-m" indicates a Q value of the antenna coil 611*a* according to the fifth comparative example.

As is apparent from FIG. 20, in the fourth and fifth comparative examples, in comparison with the fifth example, the Q values are small values that are almost equal to that in the case a conductive plate is not arranged, and preferable communication characteristics cannot be realized.

As is apparent from the results in FIGS. 19A, 19B, and 20, in the communication device 5 according to the fifth embodiment, since the conductive plate 54 is superposed on the circuit board 132 to cover at least an entire surface of the antenna coil 51*a*, preferable communication characteristics can be realized.

Figure 21:
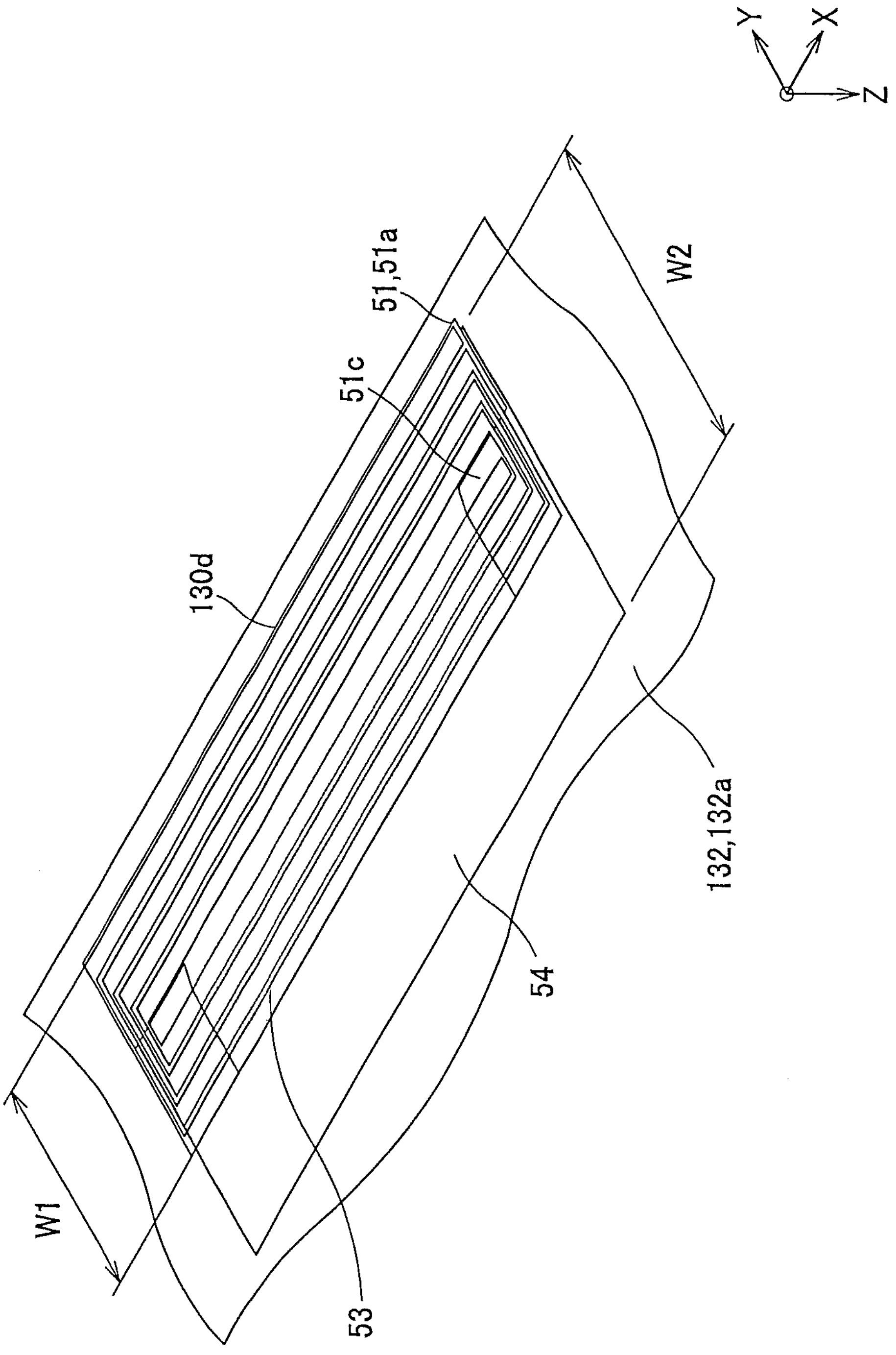
FIG. 21 is a diagram for explaining a change of communication characteristics of the antenna coil according to the fifth example depending on a change of the shape of the conductive plate.

In terms of a reduction in size, the communication device 5 is especially preferably designed such that a circumference of the conductive plate 54 is equal to a circumference of the antenna coil 51*a*. However, as shown in FIG. 21, a width W2 of the conductive plate 54 is set to be larger than a width W1 of the antenna coil 51*a* regulated in a y-axis direction to make it possible to realize more preferable communication characteristics.

Figure 22A:
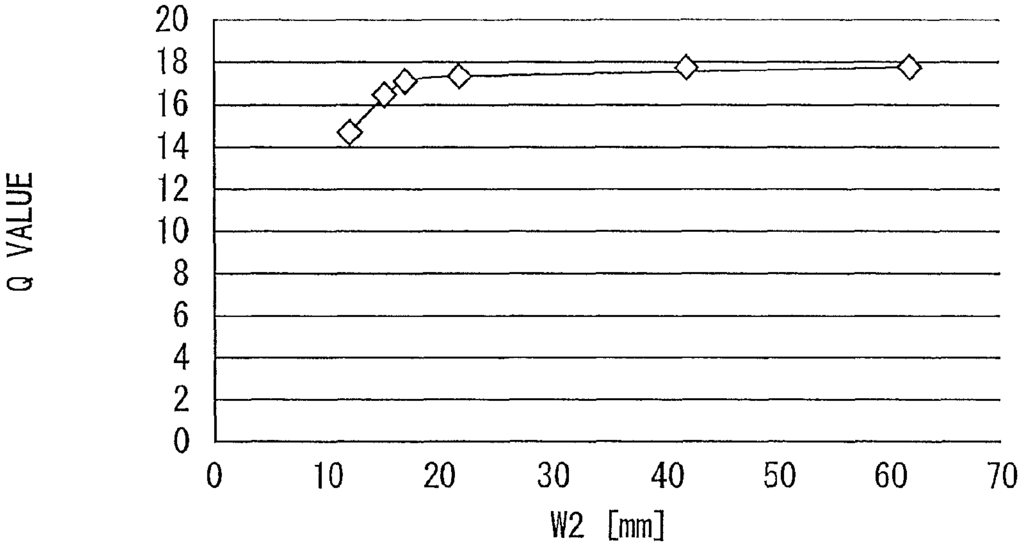
FIG. 22A is a graph showing a Q value of the antenna coil according to the fifth example depending on the change of the shape of the conductive plate.
Figure 22B:
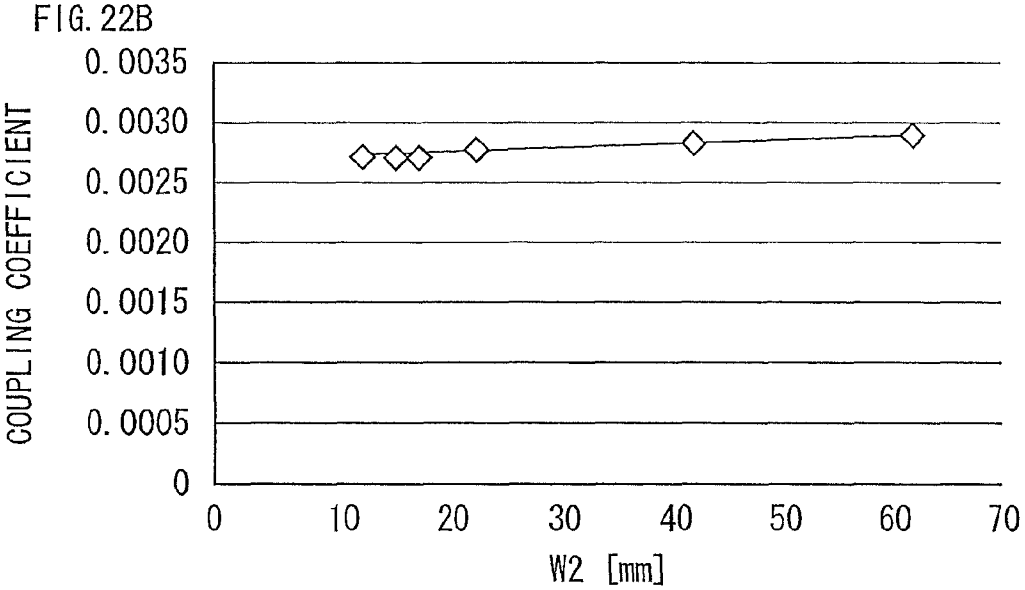
FIG. 22B is a graph showing a coupling coefficient of the antenna coil according to the fifth example depending on the change of the shape of the conductive plate.

As a concrete example, Q values and coupling coefficients of the antenna coil 51*a* obtained when the width W2 of the conductive plate 54 that entirely covers the antenna coil 51*a* is changed from 12 mm to 60 mm in a state the width W1 of the antenna coil 51*a* is fixed to 12 mm are shown in FIGS. 22A and 22B.

As is apparent from FIGS. 22A and 22B, when the width W1 of the antenna coil 51*a* is set to 12 mm, the Q value sharply increases when the width W2 falls within the range of 12 mm to 22 mm. Even though the width W2 is set to be larger than 22 mm, the Q value converges to about 18.

Thus, in the communication device 5, when the width W2 of the conductive plate 54 is selected within the range of 1 to 1.2 with respect to the width W1 of the antenna coil 51*a*, preferable communication characteristics can be realized without spoiling a reduction in size as much as possible.

Figure 23:
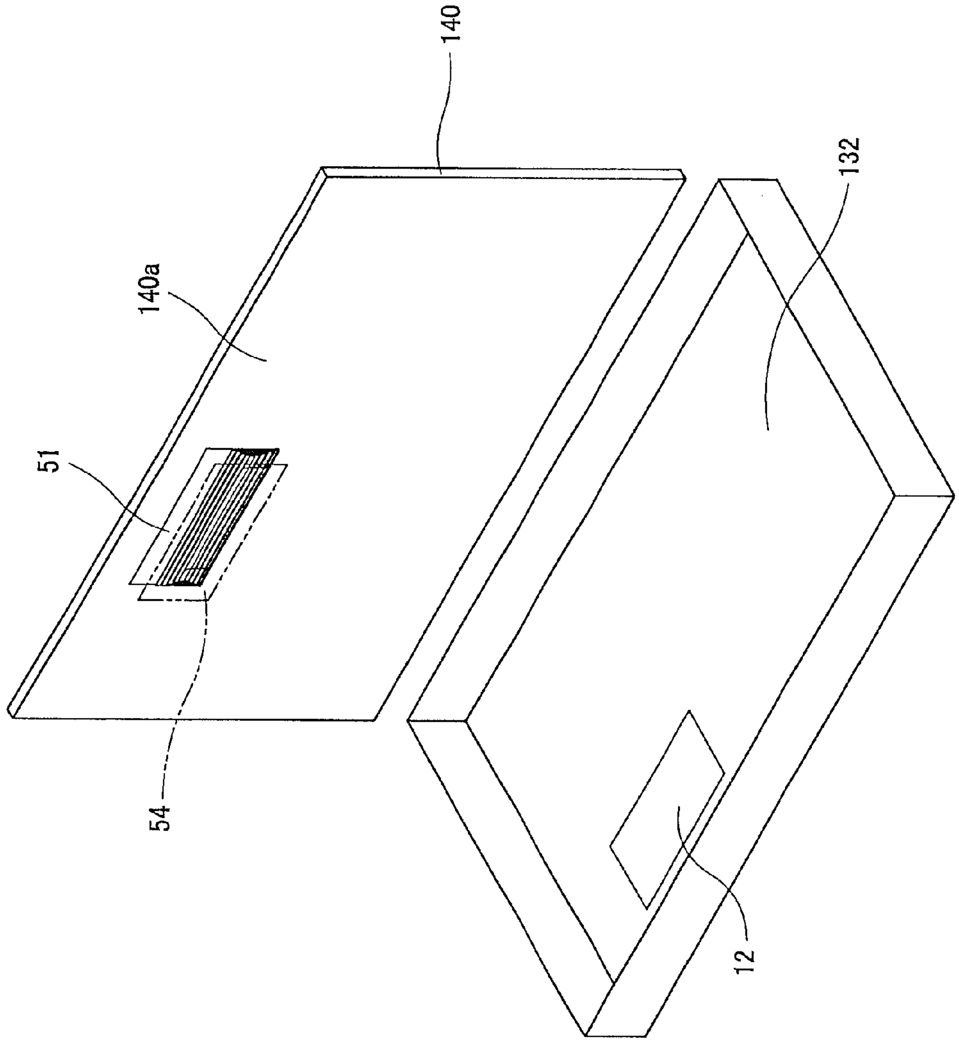
FIG. 23 is a diagram for explaining a concrete arrangement of the antenna substrate according to a fifth embodiment.

In the mobile phone 130, as shown in FIG. 23, a storing lid 140 is arranged to face the circuit board 132. When the antenna substrate 51 of the communication device 5 is mounted on a surface 140*a* facing the circuit board 132 of the storing lid 140, in terms of easily electrical connection between the antenna coil 51*a* and the communication processing unit 12 arranged in the circuit board 132 in a limited space, a terminal unit 51*b* is formed on the antenna substrate 51 as shown in FIGS. 24A and 24B, and the conductive plate 54 is preferably arranged between the antenna substrate 51 and the circuit board 132.

Figure 24B:
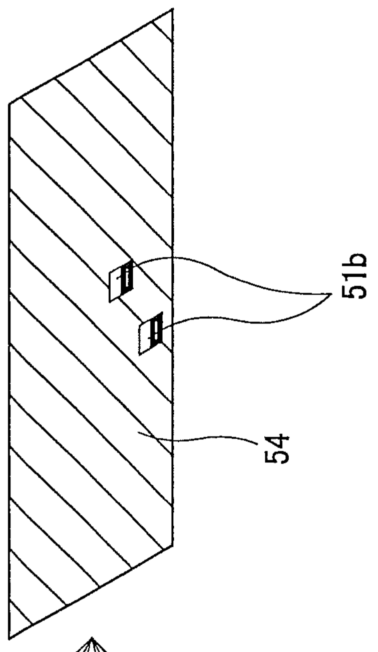
FIG. 24B is a diagram for explaining a configuration of a terminal portion formed on the antenna substrate according to the fifth embodiment.
Figure 24A:
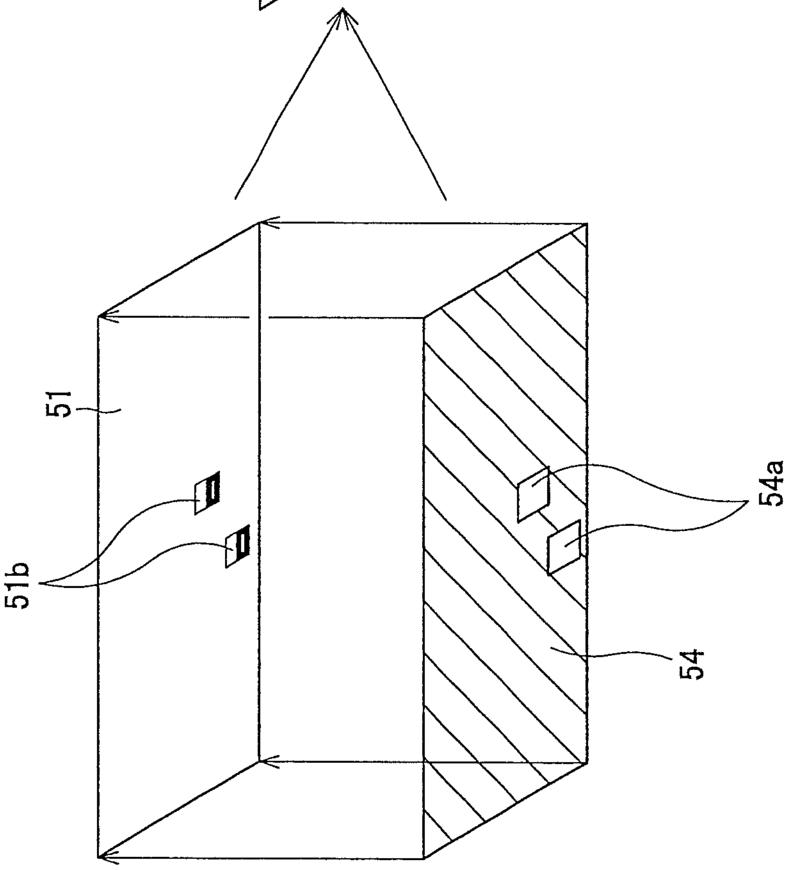
FIG. 24A is a diagram for explaining a configuration of the antenna substrate according to the fifth embodiment mounted on a surface of a storing lid.

FIGS. 24A and 24B are diagrams showing a configuration of the antenna substrate 51 mounted on the surface 140*a* of the storing lid 140. More specifically, as shown in FIG. 24A, the terminal unit 51*b* is formed on the antenna substrate 51. In the conductive plate 54 superposed on the antenna substrate 51, an opening 54*a* is formed at a position matched with the terminal unit 51*b* in a direction of thickness.

As shown in FIG. 24B, the conductive plate 54 is superposed on the antenna substrate 51 to make it possible to electrically connect the terminal unit 51*b* from the circuit board 132 side in the communication device 5. As a result, the antenna coil 51*a* and the communication processing unit 12 can be easily electrically connected to each other by using effectively use a space.

Third Embodiment

As the third embodiment, a communication device according to a sixth example to which the present invention is applied employs a structure in which an antenna coil and a magnetic sheet are superposed on each other to have almost the same plane on both the surfaces on a reader/writer side and a substrate side so as to realize a small thickness and preferable communication characteristics.

Figure 25A:
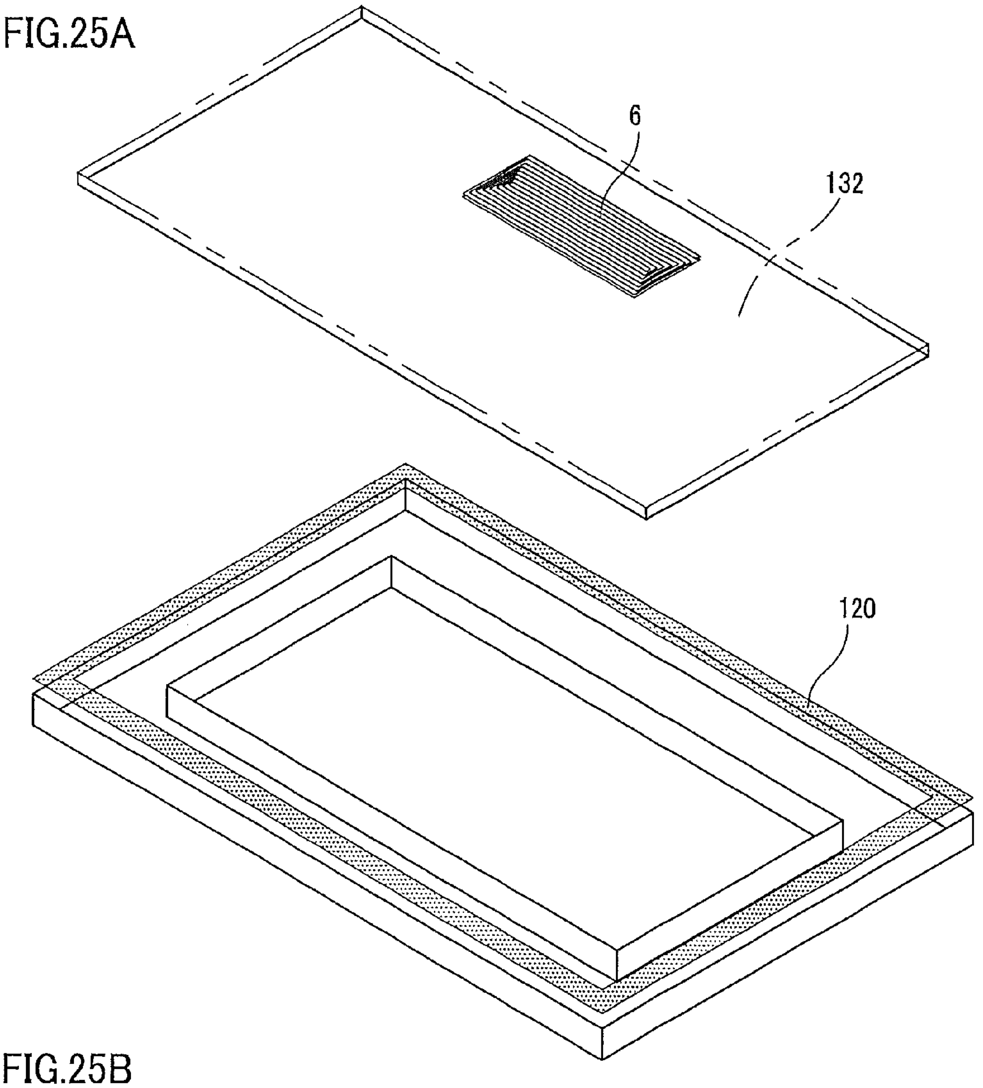
FIG. 25A is a diagram showing a positional relationship between a communication device according to a sixth example and a reader/writer.
Figure 25B:
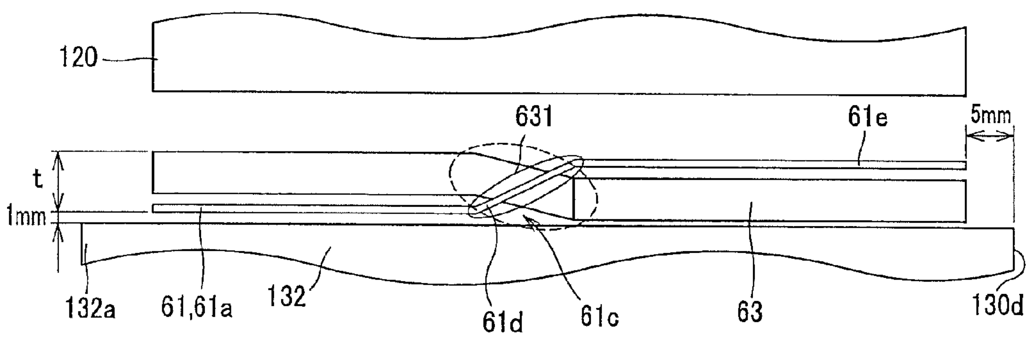
FIG. 25B is a sectional view of an antenna substrate according to the communication device according to the sixth example.

FIG. 25A is a diagram showing a positional relationship between a communication device 6 according to the sixth example and the reader/writer 120, and FIG. 25B is a sectional view of an antenna substrate 61 according to the communication device 6 according to the sixth example.

More specifically, the communication device 6, as shown in FIG. 25B, at a center portion 61*c* where a magnetic sheet 63 is inserted into a center portion of a antenna coil 61*a* formed on the antenna substrate 61, a step portion 61*d* is formed on the antenna substrate 61. In the communication device 6, a step portion 631 is formed on the magnetic sheet 63 at the center portion 61*c*. In the communication device 6, the step portions 61*d* and 631 are formed, and the magnetic sheet 63 and the antenna substrate 61 are superposed on each other to form a uniform surface extending from the center side of the housing 131 to the outer periphery side, that is, the center portion 132*a* of the circuit board 132 to the outer periphery 130*d* in the state in which the magnetic sheet 63 is inserted into the antenna substrate 61.

In this manner, in the communication device 6, since the magnetic sheet 63 and the antenna substrate 61 are on the same plane from the center side of the housing 131 to the outer periphery side in the state in which the magnetic sheet 63 is inserted into the antenna substrate 61, preferable communication characteristics can be realized while promoting a reduction in thickness. More specifically, in the communication device 6, since the magnetic sheet 63 can be increased in thickness as much as possible while promoting a reduction in thickness, preferable communication can be realized as a result.

In this case, evaluation conditions were set as follows. More specifically, as the antenna of the reader/writer 120, a 2-turn coil having dimensions of 66 mm×100 mm was used. As the circuit board 132, a stainless steel plate having 100 mm×50 mm×1.0 mm thickness was used. As the antenna substrate 61, a structure in which the magnetic sheet 63 is penetrated through the center portion 61*c* where an aperture of the 4-turn spiral antenna coil 61*a* having dimensions of 30 mm×12 mm is located was used. A distance from the surface of the circuit board 132 to the surface of the antenna substrate 61 was set to 1 mm. The antenna substrate 61, as shown in FIG. 25B, a distance from the outer periphery 130*d* serving as an end portion of the circuit board 132 regulated in a direction of width to an end portion 61*e* of the antenna substrate 61 was set to 5 mm.

Figure 26:
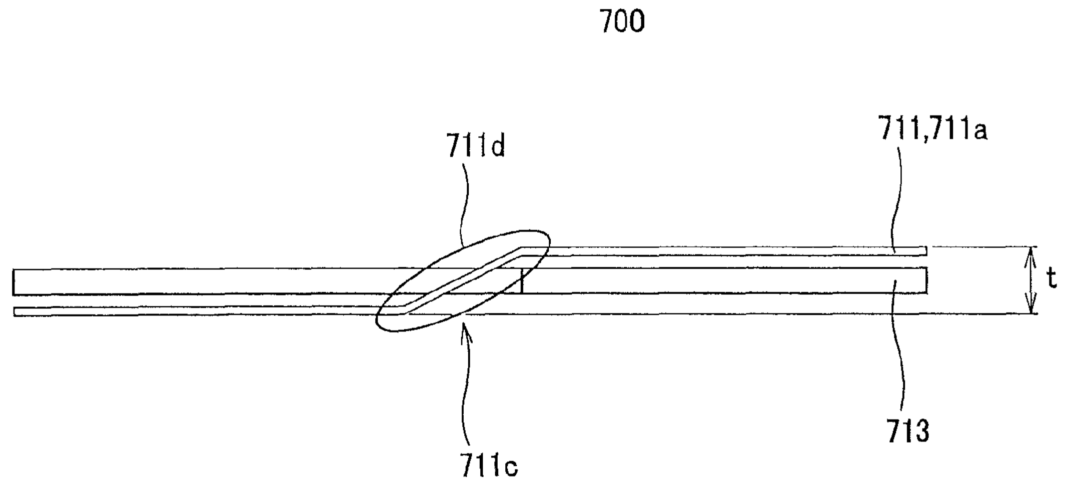
FIG. 26 is a diagram showing a communication device having a structure in which an antenna coil is inserted between magnetic sheets each having both horizontal surfaces such that a step portion is formed on a center portion of the antenna substrate.

It is assumed that, as an object to be compared, a communication device 700 having a structure shown in FIG. 26 is used. The communication device 700 has an antenna substrate 711 on which an antenna coil 711*a* is formed and which has a step portion 711*d* formed at a center portion 711*c*, and a sheet-like magnetic sheet 713 both the surfaces of which are horizontal. The magnetic sheet 713 is inserted into the center portion 711*c* of the antenna substrate 711. As an object to be compared, the communication device 700 is used, and the same evaluation conditions as those in the communication device 6 are set.

In the communication device 6 or 700, a total thickness of the antenna substrate and the magnetic sheet as shown in FIGS. 25A, 25B, and 26 was set to t [mm]. The antenna coil was configured by a flexible printed circuit board, and the thickness of the antenna substrate was fixed to 0.1 mm.

Figure 27A:
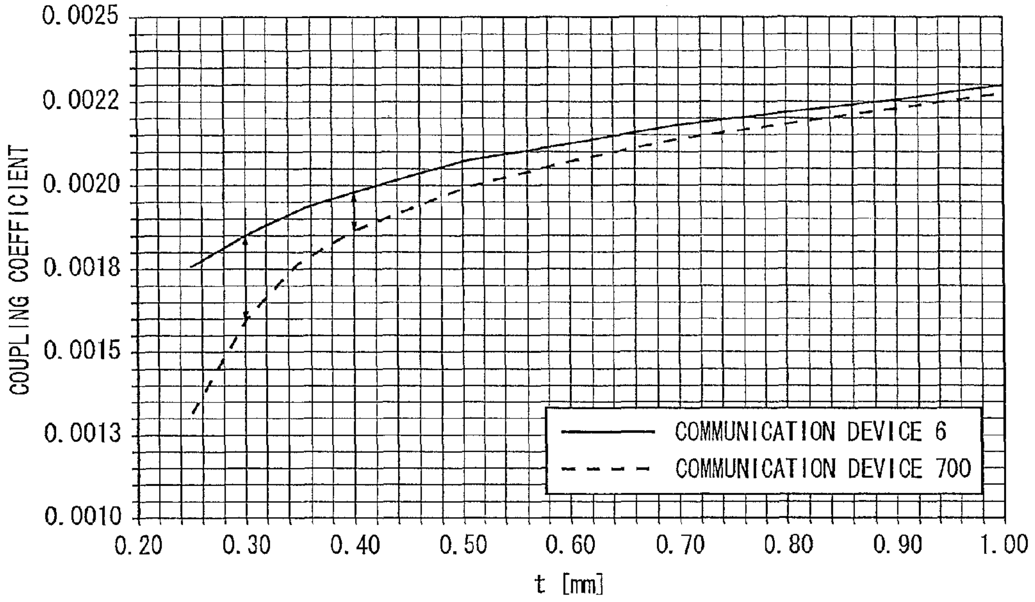
FIG. 27A is a graph showing a coupling coefficient of the communication device according to the sixth example when the magnetic sheet is change in thickness while keeping the thickness of the antenna substrate constant.
Figure 27B:
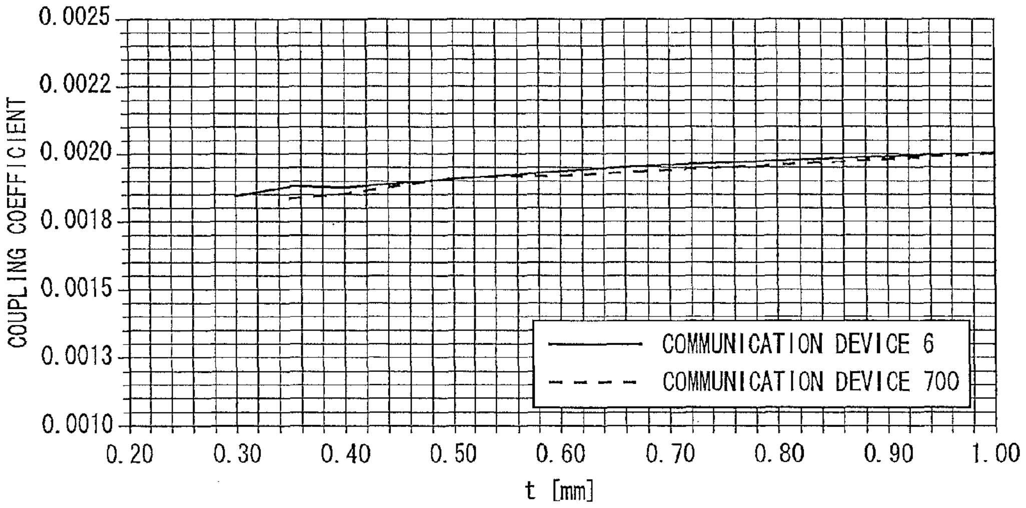
FIG. 27B is a graph showing a coupling coefficient of the communication device according to the sixth example when the antenna substrate is changed in thickness while keeping the thickness of the magnetic sheet constant.

FIGS. 27A and 27B are graphs showing coupling coefficients of the antenna coils 61*a* and 711*a* of the communication device 6 according to the sixth example and the communication device 700 when the total thickness of the antenna substrate and the magnetic sheet is changed. In this case, in FIG. 27A, a conductor thickness of the antenna coil wire is fixed to 0.035 mm, and only the thickness of the magnetic sheet is changed. In FIG. 27B, the thickness of the magnetic sheet is fixed to 0.2 mm, and only the thickness of the conductor thickness of the antenna coil wire is changed. Furthermore, the coupling coefficient of the antenna coil 61*a* is indicated by a solid line, and the coupling coefficient of the antenna coil 711*a* is indicated by a broken line.

As is apparent from the result in FIG. 27A, in the communication device 6, when only the thickness of the magnetic sheet is changed, a coupling coefficient that is higher than that of the communication device 700 by 15.5% when the total thickness of the antenna substrate and the magnetic sheet is 0.3 mm, and a coupling coefficient that is higher than that of the communication device 700 by 6.5% when the total thickness is 0.4 mm, so that preferable characteristics can be realized. As is apparent from the result in FIG. 27B, a coupling coefficient of the communication device 6 is not changed in comparison with the communication device 700 even though the thickness of the antenna substrate is changed.

Figure 28:
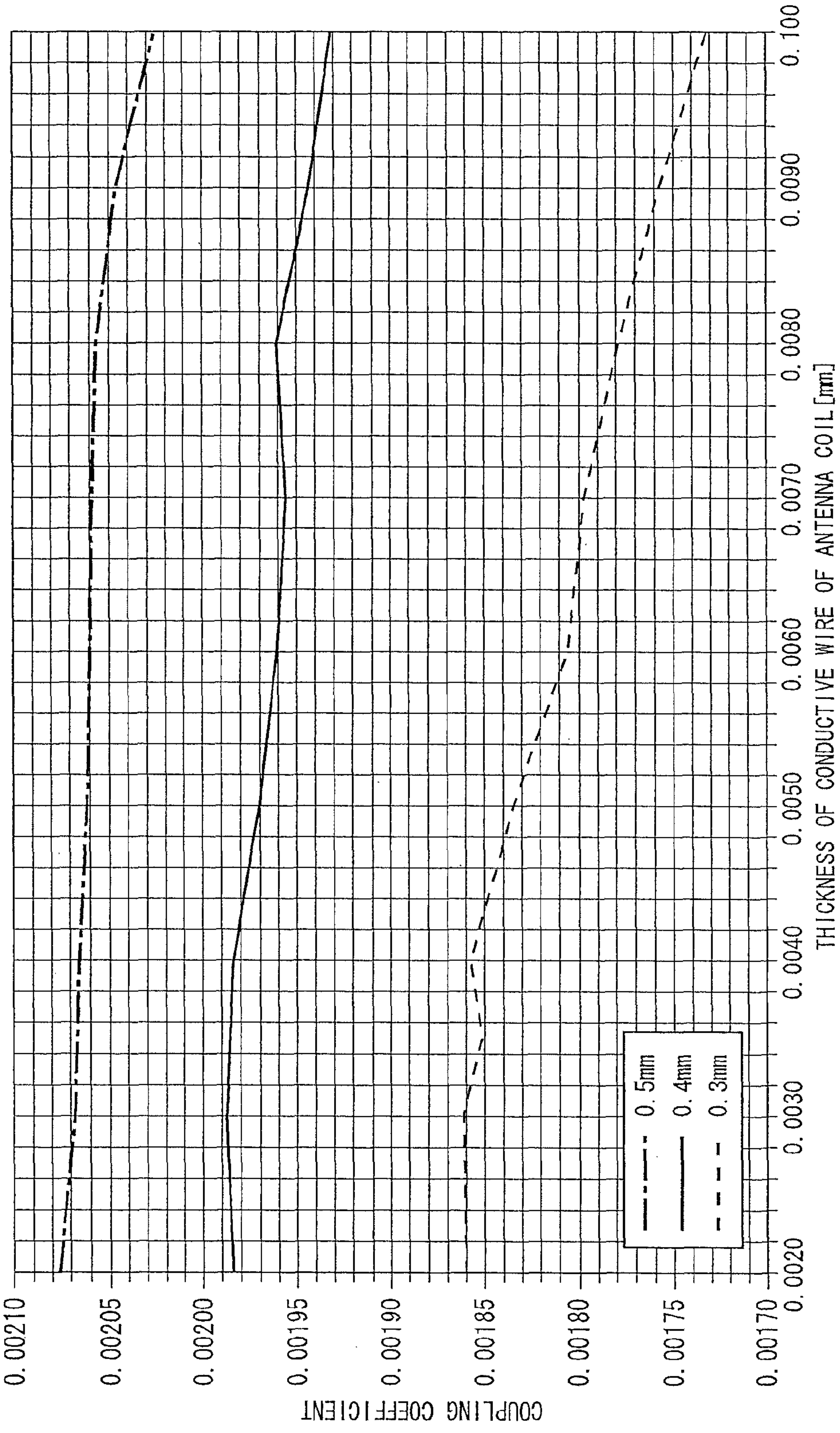
FIG. 28 is a graph showing a coupling coefficient obtained when a conductive line of the antenna coil according to the sixth example is changed in thickness in concrete examples of three types in which total thicknesses of antenna substrates and magnetic sheets are set to 0.3 mm, 0.4 mm, and 0.5 mm.
Figure 29:
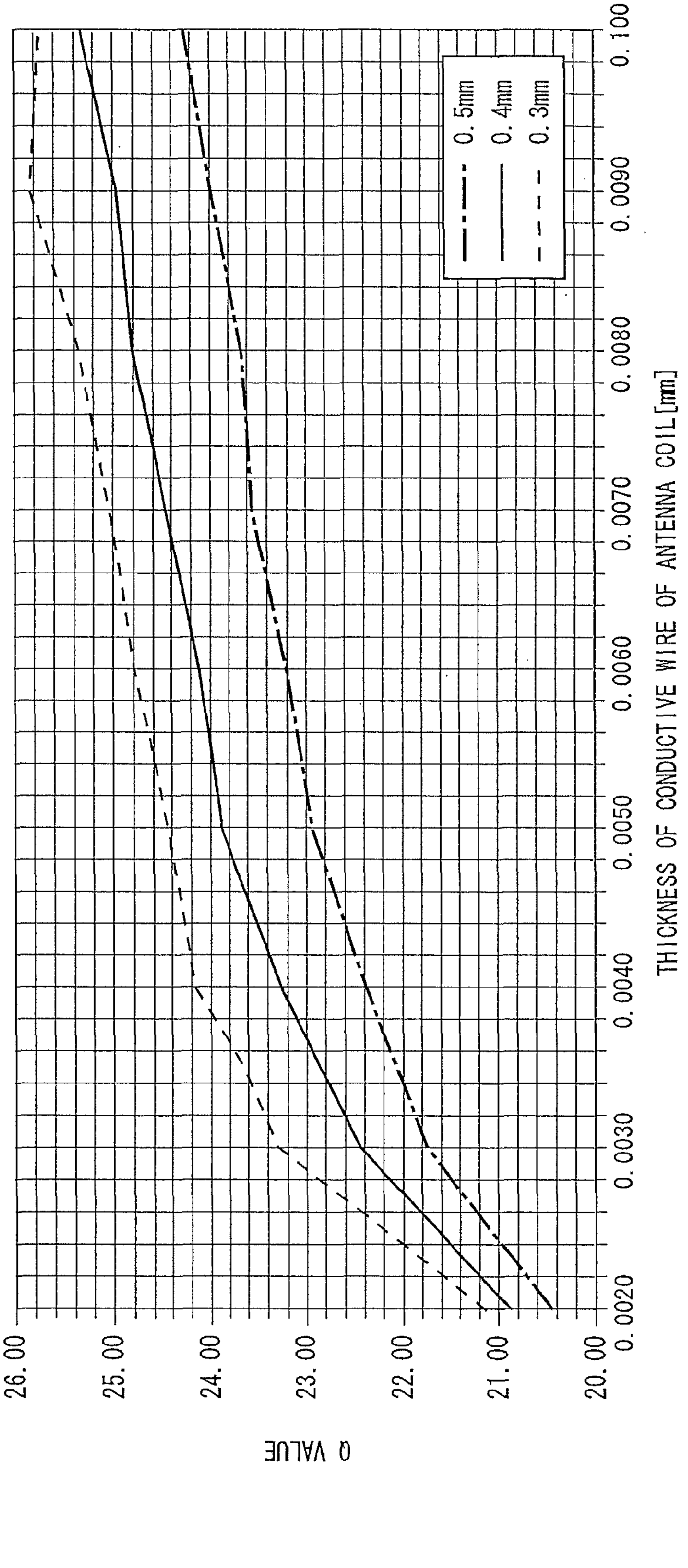
FIG. 29 is a graph showing Q values obtained when a conductive line of the antenna coil according to the sixth example is changed in thickness in concrete examples of three types in which total thicknesses of antenna substrates and magnetic sheets are set to 0.3 mm, 0.4 mm, and 0.5 mm.
Figure 30:
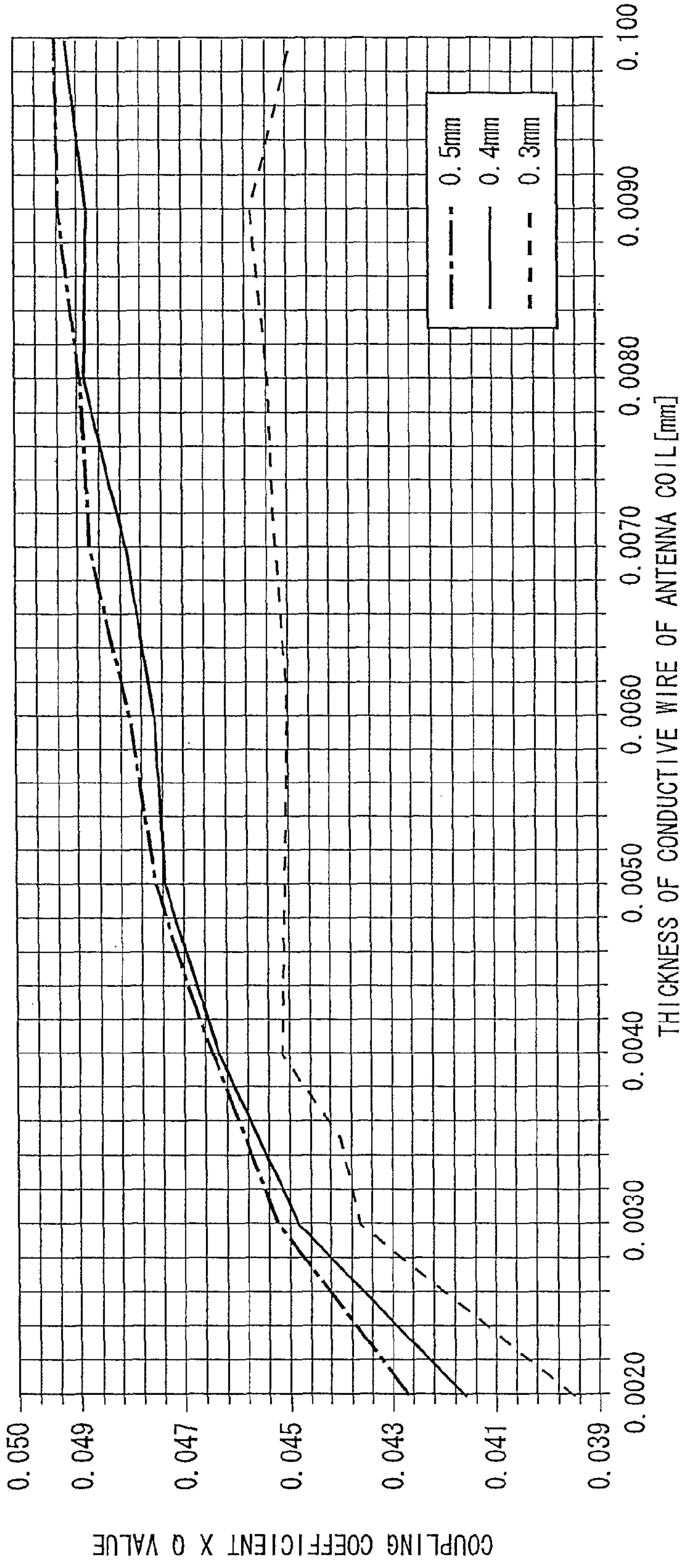
FIG. 30 is a graph showing products of coupling coefficients and Q values obtained when a conductive line of the antenna coil according to the sixth example is changed in thickness in concrete examples of three types in which total thicknesses of antenna substrates and magnetic sheets are set to 0.3 mm, 0.4 mm, and 0.5 mm.

As performance evaluation of the communication device 6, in concrete examples of three types in which total thicknesses of the antenna substrates and the magnetic sheets are set to 0.3 mm, 0.4 mm, and 0.5 mm, coupling coefficients and Q values and products between the coupling coefficients and the Q values obtained when the conductor thickness of the antenna coil 61*a* is changed are shown in FIGS. 28, 29, and 30, respectively.

In this case, as is apparent from the result in FIG. 28, a coupling coefficient increases when the conductor thickness of the antenna coil 61*a* is reduced, in other words, the magnetic sheet 63 is increased in thickness. In contrast to this, as is apparent from the result in FIG. 29, when the conductor thickness of the antenna coil 61*a* is increased in thickness, the Q value increases.

As is apparent from the result in FIG. 30, when the total thickness is 0.3 mm, the conductor thickness of the antenna coil 61*a* is 40 μm or more, and communication characteristics are almost constant. In contrast to this, in FIG. 30, when the total thicknesses are 0.4 mm and 0.5 mm, the communication characteristics are improved when the conductor thickness of the antenna coil 61*a* is increased.

As is apparent from the results in FIGS. 28 to 30, in the communication device 6, when a reduction in thickness, for example, a total thickness of 0.3 mm, is strongly demanded, it is preferable in terms of communication characteristics that the thickness of the magnetic sheet is increased as much as possible in a condition in which a predetermined conductor thickness or more of the antenna coil is secured. This is because, since a high-frequency signal having a frequency of 13.56 MHz causes a current to flow in the surface of the antenna coil with a skin effect, the thickness of the magnetic sheet is increased as much as possible by securing the predetermined conductor thickness or more to make it possible to improve the communication characteristics.

In this manner, the communication device 6 according to the fifth example employs a structure in which the magnetic sheet 63 and the antenna substrate 61 form a uniform surface extending from the center side of the housing 131 to the outer periphery side such that the magnetic sheet 63 is inserted into the antenna substrate 61 so as to make it possible to realize a reduction in thickness and preferable communication characteristics.

<Modification>

Figure 31A:
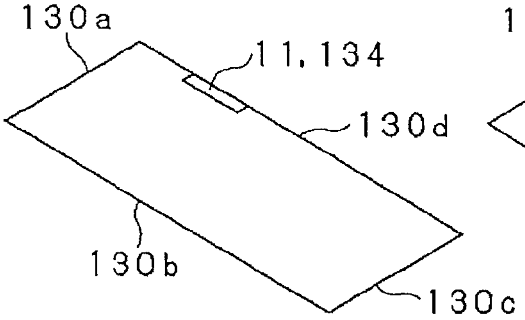
FIG. 31A is a diagram showing an antenna substrate arranged on an outer peripheral portion on an outer periphery 130*d* side.
Figure 31B:
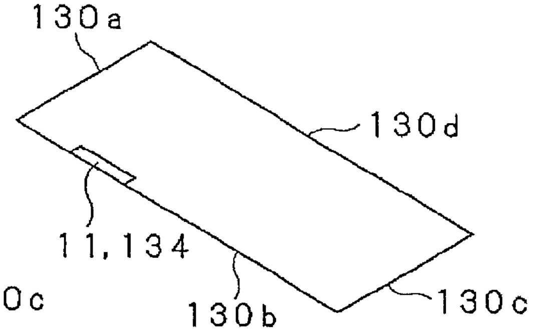
FIG. 31B is a diagram showing an antenna substrate arranged on an outer peripheral portion on another outer periphery 130*b* side.
Figure 31C:
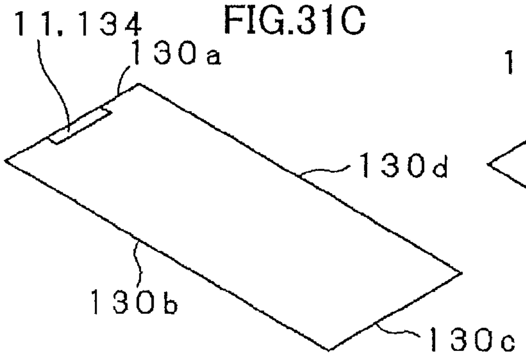
FIG. 31C is a diagram showing an antenna substrate arranged on an outer peripheral portion on still another outer periphery 130*a* side.
Figure 31D:
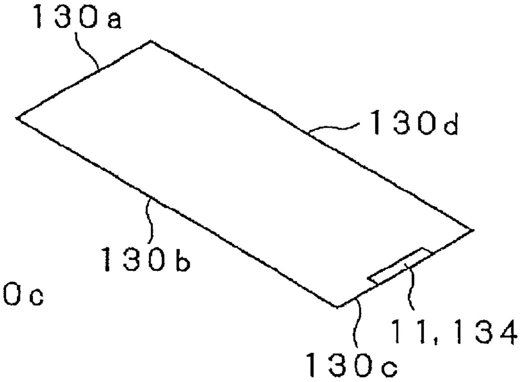
FIG. 31D is a diagram showing an antenna substrate arranged on an outer peripheral portion on still another outer periphery 130*c* side.

In the communication devices to which the present invention is applied, as shown in FIG. 31A, the antenna substrates 11, 21, 31, 41, 51, and 61 may be arranged on not only the outer peripheral portion 134 on the outer periphery 130*d* side of the outer peripheries 130*a*, 130*b*, 130*c*, and 130*d* but also, for example, as shown in FIG. 31B, the outer peripheral portion 134 on the outer periphery 130*b* side, as shown in FIG. 31C, the outer peripheral portion 134 on the outer periphery 130*a* side, or, as shown in FIG. 31D, the outer peripheral portion 134 on the outer periphery 130*c* side.

Figure 32:
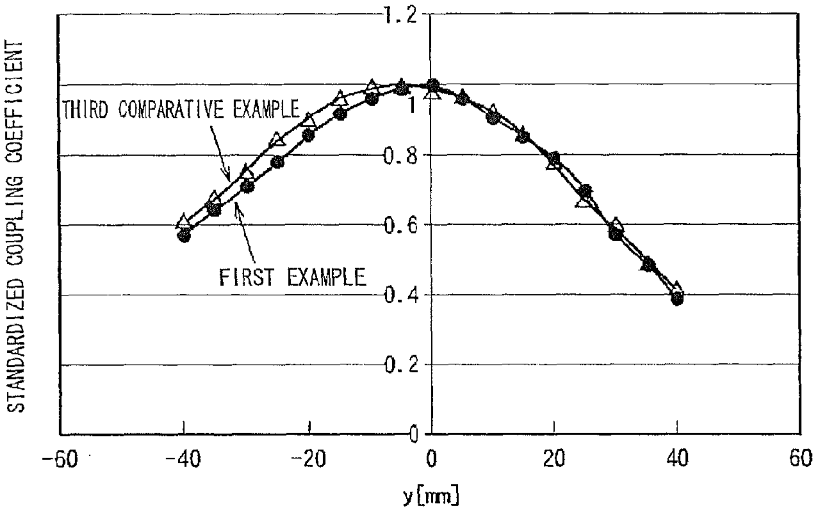
FIG. 32 is a graph for explaining a change in communication sensitivity when relative positions of a mobile phone in which a communication device is built and a reader/writer are changed.

When the antenna substrate 11 is arranged on the outer peripheral portion 134 on an arbitrary outer periphery side of the outer peripheries 130*a*, 130*b*, 130*c*, and 130*d*, as a concrete example, communication sensitivity obtained when relative positions a mobile phone in which the communication device 1 according to the first example is built and a reader/writer are changed is evaluated with reference to FIG. 32.

It is assumed that, with reference to the position of the reader/writer, a coupling coefficient between the communication device 1 and the reader/writer 120 when the position of the mobile phone 130 in which the antenna substrate 11 of the communication device 1 according to the first embodiment is mounted is moved in a y-axis direction is measured to make a performance evaluation. An interval between the reader/writer 120 and the mobile phone 130, i.e., a separation distance in a z-axis direction is set to 50 [mm]. As a comparative example, a coupling coefficient between the communication device 400 and the reader/writer obtained when a mobile phone in which the communication device 400 according to the third comparative example is built is moved in a y-axis direction with reference to the position of the reader/writer is measured.

A measurement result of the coupling coefficient obtained at this time is shown in FIG. 32. In the communication device 1, although the antenna substrate 11 is arranged on only the outer periphery 130*d* side of the mobile phone 130, even though the mobile phone 130 is shifted in the y-axis direction, the communication characteristics of the communication device 400 according to the third comparative example slightly change. As is apparent from the performance evaluation, the communication device to which the present invention is applied can be designed to have preferable communication characteristics, even though one antenna substrate 11 is arranged on the outer peripheral portion 134 on an arbitrary outer periphery side of the outer peripheries 130*a*, 130*b*, 130*c*, and 130*d*, regardless of a relative positional relationship between the mobile phone and the reader/writer.

Figure 33A:
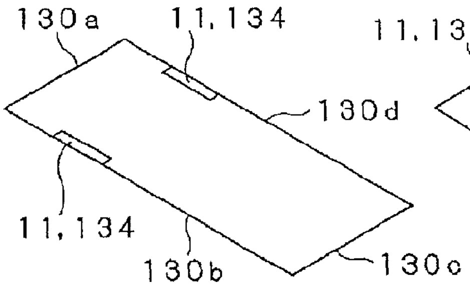
FIG. 33A is a diagram showing two antenna substrates arranged on outer peripheral portions on the outer periphery 130*b* side and the outer periphery 130*d* side.
Figure 33B:
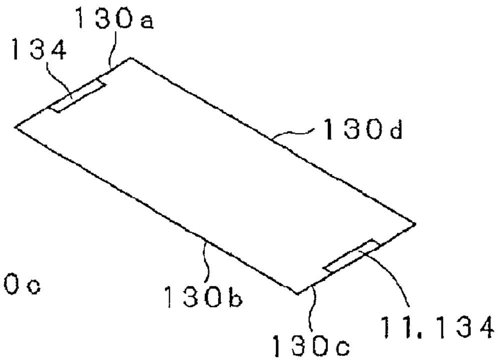
FIG. 33B is a diagram showing two antenna substrates arranged on outer peripheral portions on the outer periphery 130*a* side and the outer periphery 130*c* side.

In the communication device to which the present invention is applied, as described above, since the area of the antenna coil can be reduced, a plurality of antenna substrates 11 may be arranged. For example, as shown in FIG. 33A, the antenna substrates 11 may be arranged on the outer peripheral portions 134 on the outer periphery 130*b* side and the outer periphery 130*d* side, and, as shown in FIG. 33B, the antenna substrates 11 may be arranged on the outer peripheral portions 134 on the outer periphery 130*a* side and the outer periphery 130*c* side, thereby the antenna coils of the antenna substrates 11 and the communication processing unit may be electrically connected to each other.

In the communication apparatus to which the present invention is applied, for example, as shown in FIG. 34A, the antenna substrates 11 may be arranged on the outer peripheral portions 134 on the outer periphery 130*a* side, the outer periphery 130*b* side, and the outer periphery 130*d* side, or, as shown in FIG. 34B, the antenna substrates 11 may be arranged on the outer peripheral portions 134 on the outer periphery 130*a* side, the outer periphery 130*c* side, and the outer periphery 130*d* side, thereby the antenna coils of the antenna substrates 11 may be electrically connected to each other.

In the communication device to which the present invention is applied, for example, as shown in FIG. 35, the antenna substrates 11 may be arranged on the outer peripheral portions 134 on the outer periphery 130*a* side, the outer periphery 130*b* side, the outer periphery 130*c* side, and the outer periphery 130*d* side, and the antenna coils of the antenna substrates 11 and the communication processing unit may be electrically connected to each other.

What is claimed is:

1. An antenna device that is built in an electronic device and that can perform communication by receiving a magnetic field transmitted from a transmitter, comprising:

an antenna coil arranged on an outer peripheral portion of a housing surface facing the transmitter of the electronic device and inductively coupled to the transmitter; and a magnetic sheet that attracts a magnetic field transmitted from the transmitter to the antenna coil, wherein the antenna coil and the magnetic sheet are superposed on each other to satisfy at least one of arrangement conditions including an arrangement condition in which the magnetic sheet is located on the transmitter side of the antenna coil on a center side of the housing surface and an arrangement condition in which the antenna coil is located on the transmitter side of the magnetic sheet on an outer periphery side of the housing surface.

2. The antenna device according to claim 1, wherein the antenna coil is formed by using a signal line on a printed circuit board.

3. The antenna device according to claim 2, wherein, when the magnetic sheet is inserted in a center portion of the antenna coil formed on the printed circuit board, the antenna coil and the magnetic sheet are superposed on each other to satisfy both arrangement conditions including an arrangement condition in which the magnetic sheet is located on the transmitter side of the antenna coil on the center side of the housing surface and an arrangement condition in which the antenna coil is located on the transmitter side of the magnetic sheet on the outer periphery side of the housing surface.

4. The antenna device according to claim 3, wherein the antenna device is arranged between a metal plate facing the transmitter arranged in the housing and the housing, and step portions are formed on the antenna substrate and the magnetic sheet at a position where the magnetic sheet is inserted into a center portion of the antenna coil formed on the antenna substrate, and the antenna substrate and the magnetic sheet are superposed on each other to form a uniform surface from the center side of the housing surface to the outer periphery side in the inserted state.

5. The antenna device according to claim 1, wherein the antenna device is arranged between a metal plate arranged in the housing and the housing, and includes a plate-shaped conductor plate that is made of a conductive material having a conductivity higher than the metal plate and superposed on the metal plate to cover at least an entire surface of the antenna coil while being insulated from the antenna coil.

6. A communication device that is built in an electronic device and can perform communication by receiving a magnetic field transmitted from a transmitter, comprising:

an antenna coil arranged on an outer peripheral portion of a housing surface facing the transmitter of the electronic device and inductively coupled to the transmitter;

a magnetic sheet that attracts a magnetic field transmitted from the transmitter to the antenna coil; and a communication processing unit that is driven by a current flowing in the antenna coil and performs communication with the transmitter, wherein the antenna coil and the magnetic sheet are superposed on each other to satisfy at least one of arrangement conditions including an arrangement condition in which the magnetic sheet is located on the transmitter side of the antenna coil on a center side of the housing surface and an arrangement condition in which the antenna coil is located on the transmitter side of the magnetic sheet on an outer periphery side of the housing surface.

7. The communication device according to claim 6, wherein the plurality of antenna coils are arranged on an outer peripheral portion of the housing surface facing the transmitter of the electronic device, the plurality of antenna coils arranged on the outer peripheral portion of the housing surface are arranged to be superposed on the magnetic sheet, and the communication processing unit is driven by a current flowing in the plurality of antenna coils arranged on the outer peripheral portion of the housing surface, and communicates with the transmitter.

8. The communication device according to claim 6, wherein the electronic device is a mobile electronic device.

* * * * *